US012666016B2

(12) United States Patent
Lim et al.

(10) Patent No.: US 12,666,016 B2
(45) Date of Patent: Jun. 23, 2026

(54) FEATURE ENCODING/DECODING METHOD AND APPARATUS, AND RECORDING MEDIUM STORING BITSTREAM

(71) Applicant: LG Electronics Inc., Seoul (KR)

(72) Inventors: Jaehyun Lim, Seoul (KR); Chul Keun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/697,111

(22) PCT Filed: Sep. 29, 2022

(86) PCT No.: PCT/KR2022/014686
§ 371 (c)(1),
(2) Date: Mar. 29, 2024

(87) PCT Pub. No.: WO2023/055141
PCT Pub. Date: Apr. 6, 2023

(65) Prior Publication Data
US 2024/0414332 A1     Dec. 12, 2024

Related U.S. Application Data

(60) Provisional application No. 63/250,133, filed on Sep. 29, 2021.

(51) Int. Cl.
*H04N 19/00*        (2014.01)
*H04N 19/117*       (2014.01)
(Continued)

(52) U.S. Cl.
CPC ........... *H04N 19/117* (2014.11); *H04N 19/60* (2014.11); *H04N 19/70* (2014.11)

(58) Field of Classification Search
None
See application file for complete search history.

(56) References Cited

U.S. PATENT DOCUMENTS

2018/0240221 A1 *  8/2018  Rijnders .............. H04N 19/149
2021/0067785 A1 *  3/2021  Zhang .................. H04N 19/159
(Continued)

FOREIGN PATENT DOCUMENTS

KR     10-2019-0117651     10/2019
KR     10-2021-0050186     5/2021
WO     WO 2021/177652      9/2021

OTHER PUBLICATIONS

International Search Report and Written Opinion in International Appln. No. PCT/KR2022/014686, mailed on Jan. 18, 2023, 10 pages (with partial English translation).

*Primary Examiner* — Zhihan Zhou
(74) *Attorney, Agent, or Firm* — Fish & Richardson P.C.

(57) ABSTRACT

Provided are a feature encoding/decoding method and apparatus, and a computer-readable recording medium generated by the feature encoding method are provided. The feature decoding method according to the present disclosure may comprise the steps of: acquiring, from a bitstream, first feature information and filtering information regarding the first feature information; inversely transforming the first feature information; and deriving, on the basis of the filtering information, second feature information for the inversely transformed first feature information.

13 Claims, 15 Drawing Sheets

(51) Int. Cl.
    *H04N 19/60*        (2014.01)
    *H04N 19/70*        (2014.01)

(56)              References Cited

U.S. PATENT DOCUMENTS

| | | | |
|---|---|---|---|
| 2021/0203997 A1* | 7/2021 | Veselov | ............... G06V 10/454 |
| 2023/0044532 A1* | 2/2023 | Dinh | ..................... H04N 19/86 |
| 2023/0082561 A1* | 3/2023 | Kim | .................. H04N 19/1883 |
| | | | 375/240.03 |

* cited by examiner (a)            (b)

FEATURE ENCODING/DECODING METHOD AND APPARATUS, AND RECORDING MEDIUM STORING BITSTREAM

CROSS-REFERENCE TO RELATED APPLICATIONS

This application is a National Stage application under 35 U.S.C. § 371 of International Application No. PCT/KR2022/014686, filed on Sep. 29, 2022, which claims the benefit of U.S. Provisional Application No. 63/250,133, filed on Sep. 29, 2021. The disclosures of the prior applications are incorporated by reference in their entirety.

TECHNICAL FIELD

The present disclosure relates to a feature encoding/decoding method and apparatus, and more specifically, to a feature encoding/decoding method and apparatus for compensating for errors according to feature point dimension reduction, and a recording medium storing a bitstream generated by the feature encoding method/decoding apparatus of the present disclosure.

BACKGROUND

With the development of machine learning technology, demand for image processing-based artificial intelligence services is increasing. In order to effectively process a vast amount of image data required for artificial intelligence services within limited resources, image compression technology optimized for machine task performance is essential. However, existing image compression technology has been developed with the goal of high-resolution, high-quality image processing for human vision, and has the problem of being unsuitable for artificial intelligence services. Accordingly, research and development on new machine-oriented image compression technology suitable for artificial intelligence services is actively underway.

SUMMARY

An object of the present disclosure is to provide a feature encoding/decoding method and apparatus with improved encoding/decoding efficiency.

An object of the present disclosure is to provide a feature encoding/decoding method and apparatus for compensating for errors due to feature point dimension reduction.

An object of the present disclosure is to provide a feature encoding/decoding method and apparatus for applying a filter to minimize a difference between a feature map before applying feature dimension reduction and a feature map reconstructed to an original dimension.

An object of the present disclosure is to provide a feature encoding/decoding method and apparatus for transmitting information related to the filter.

Another object of the present disclosure is to provide a method or apparatus for transmitting a bitstream generated by a feature encoding method or apparatus.

Another object of the present disclosure is to provide a recording medium storing a bitstream generated by a feature encoding method or apparatus according to the present disclosure.

Another object of the present disclosure is to provide a recording medium storing a bitstream received, decoded and used to reconstruct a feature by a feature decoding apparatus according to the present disclosure.

The technical problems solved by the present disclosure are not limited to the above technical problems and other technical problems which are not described herein will become apparent to those skilled in the art from the following description.

A feature decoding method according to an aspect of the present disclosure may comprise obtaining first feature information and filtering information for the first feature information from a bitstream, inversely transforming the first feature information and deriving second feature information for the inversely transformed first feature information based on the filtering information.

A feature encoding method according to another aspect of the present disclosure may comprise deriving transformed feature information based on feature information extracted from an image, deriving inversely transformed feature information based on the transformed feature information and deriving filtering information based on the inversely transformed feature information.

In addition, a recording medium according to another aspect of the present disclosure may store a bitstream generated by the feature encoding apparatus or the feature encoding method of the present disclosure.

In addition, a transmission method according to another aspect of the present disclosure may transmit a bitstream generated by the feature encoding apparatus or the feature encoding method of the present disclosure to a feature decoding apparatus.

The features briefly summarized above with respect to the present disclosure are merely exemplary aspects of the detailed description below of the present disclosure, and do not limit the scope of the present disclosure.

According to the present disclosure, it is possible to provide a feature encoding/decoding method and apparatus with improved encoding/decoding efficiency.

Also, according to the present disclosure, since errors due to feature point dimension reduction are compensated, it is possible to improve accuracy of a reconstructed feature.

Also, according to the present disclosure, compression efficiency for features can be improved by improving the accuracy of the reconstructed feature.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 6 is a flowchart schematically illustrating a feature/feature map decoding procedure to which embodiments of the present disclosure are applicable.

FIG. 18 is a flowchart illustrating a feature encoding method according to an embodiment of the present disclosure.

DETAILED DESCRIPTION

Figure 1:
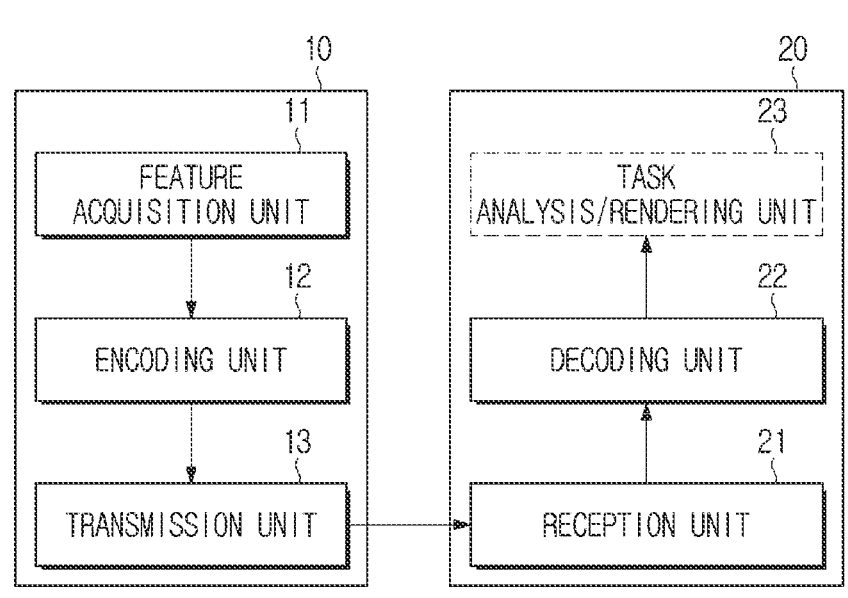
FIG. 1 is a view schematically showing a VCM system to which embodiments of the present disclosure are applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, in case it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

The present disclosure may be applied to a method disclosed in a Versatile Video Coding (VVC) standard and/or a Video Coding for Machines (VCM) standard. In addition, the present disclosure may be applied to a method disclosed in an essential video coding (EVC) standard, AOMedia Video 1 (AV1) standard, 2nd generation of audio video coding standard (AVS2), or a next-generation video/image coding standard (e.g., H.267 or H.268, etc.).

This disclosure provides various embodiments related to video/image coding, and, unless otherwise stated, the embodiments may be performed in combination with each other. In the present disclosure, "video" refers to a set of a series of images according to the passage of time. An "image" may be information generated by artificial intelligence (AI). Input information used in the process of performing a series of tasks by AI, information generated during the information processing process, and the output information may be used as images. In the present disclosure, a "picture" generally refers to a unit representing one image in a specific time period, and a slice/tile is a coding unit constituting a part of a picture in encoding. One picture may be composed of one or more slices/tiles. In addition, a slice/tile may include one or more coding tree units (CTUs). The CTU may be partitioned into one or more CUs. A tile is a rectangular region present in a specific tile row and a specific tile column in a picture, and may be composed of a plurality of CTUs. A tile column may be defined as a rectangular region of CTUs, may have the same height as a picture, and may have a width specified by a syntax element signaled from a bitstream part such as a picture parameter set. A tile row may be defined as a rectangular region of CTUs, may have the same width as a picture, and may have a height specified by a syntax element signaled from a bitstream part such as a picture parameter set. A tile scan is a certain continuous ordering method of CTUs partitioning a picture. Here, CTUs may be sequentially ordered according to a CTU raster scan within a tile, and tiles in a picture may be sequentially ordered according to a raster scan order of tiles of the picture. A slice may contain an integer number of complete tiles, or may contain a continuous integer number of complete CTU rows within one tile of one picture. A slice may be exclusively included in a single NAL unit. One picture may be composed of one or more tile groups. One tile group may include one or more tiles. A brick may indicate a rectangular region of CTU rows within a tile in a picture. One tile may include one or more bricks. The brick may refer to a rectangular region of CTU rows in a tile. One tile may be split into a plurality of bricks, and each brick may include one or more CTU rows belonging to a tile. A tile which is not split into a plurality of bricks may also be treated as a brick.

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In an embodiment, especially when applied to VCM, when there is a picture composed of a set of components having different characteristics and meanings, a pixel/pixel value may represent a pixel/pixel value of a component generated through independent information or combination, synthesis, and analysis of each component. For example, in RGB input, only the pixel/pixel value of R may be represented, only the pixel/pixel value of G may be represented, or only the pixel/pixel value of B may be represented. For example, only the pixel/pixel value of a luma component synthesized using the R, G, and B components may be represented. For example, only the pixel/pixel values of images and information extracted through analysis of R, G, and B components from components may be represented.

In the present disclosure, a "unit" may represent a basic unit of image processing. The unit may include at least one of a specific region of the picture and information related to the region. One unit may include one luma block and two chroma (e.g., Cb and Cr) blocks. The unit may be used interchangeably with terms such as "sample array", "block" or "area" in some cases. In a general case, an M×N block may include samples (or sample arrays) or a set (or array) of transform coefficients of M columns and N rows. In an embodiment, In particular, especially when applied to VCM, the unit may represent a basic unit containing information for performing a specific task.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed. "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

The present disclosure relates to video/image coding for machines (VCM).

VCM refers to a compression technology that encodes/decodes part of a source image/video or information obtained from the source image/video for the purpose of machine vision. In VCM, the encoding/decoding target may be referred to as a feature. The feature may refer to information extracted from the source image/video based on task purpose, requirements, surrounding environment, etc. The feature may have a different information form from the source image/video, and accordingly, the compression method and expression format of the feature may also be different from those of the video source.

VCM may be applied to a variety of application fields. For example, in a surveillance system that recognizes and tracks objects or people, VCM may be used to store or transmit object recognition information. In addition, in intelligent transportation or smart traffic systems, VCM may be used to transmit vehicle location information collected from GPS, sensing information collected from LIDAR, radar, etc., and various vehicle control information to other vehicles or infrastructure. Additionally, in the smart city field. VCM may be used to perform individual tasks of interconnected sensor nodes or devices.

The present disclosure provides various embodiments of feature/feature map coding. Unless otherwise specified, embodiments of the present disclosure may be implemented individually, or may be implemented in combination of two or more.

Overview of VCM System

FIG. 1 is a diagram schematically showing a VCM system to which embodiments of the present disclosure are applicable.

Referring to FIG. 1, the VCM system may include an encoding apparatus 10 and a decoding apparatus 20.

The encoding apparatus 10 may compress/encode a feature/feature map extracted from a source image/video to generate a bitstream, and transmit the generated bitstream to the decoding apparatus 20 through a storage medium or network. The encoding apparatus 10 may also be referred to as a feature encoding apparatus. In a VCM system, the feature/feature map may be generated at each hidden layer of a neural network. The size and number of channels of the generated feature map may vary depending on the type of neural network or the location of the hidden layer. In the present disclosure, a feature map may be referred to as a feature set, and a feature or feature map may be referred to as "feature information".

The encoding apparatus 10 may include a feature acquisition unit 11, an encoding unit 12, and a transmission unit 13.

The feature acquisition unit 11 may acquire a feature/feature map for the source image/video. Depending on the embodiment, the feature acquisition unit 11 may acquire a feature/feature map from an external device, for example, a feature extraction network. In this case, the feature acquisition unit 11 performs a feature reception interface function. Alternatively, the feature acquisition unit 11 may acquire a feature/feature map by executing a neural network (e.g., CNN, DNN, etc.) using the source image/video as input. In this case, the feature acquisition unit 11 performs a feature extraction network function.

Depending on the embodiment, the encoding apparatus 10 may further include a source image generator (not shown) for acquiring the source image/video. The source image generator may be implemented with an image sensor, a camera module, etc., and may acquire the source image/video through an image/video capture, synthesis, or generation process. In this case, the generated source image/video may be sent to the feature extraction network and used as input data for extracting the feature/feature map.

The encoding unit 12 may encode the feature/feature map acquired by the feature acquisition unit 11. The encoding unit 12 may perform a series of procedures such as prediction, transform, and quantization to increase encoding efficiency. The encoded data (encoded feature/feature map information) may be output in the form of a bitstream. The bitstream containing the encoded feature/feature map information may be referred to as a VCM bitstream.

The transmission unit 13 may obtain feature/feature map information or data output in the form of a bitstream and forward it to the decoding apparatus 20 or another external object through a digital storage medium or network in the form of a file or streaming. Here, digital storage media may include various storage media such as USB, SD, CD, DVD, Blu-ray, HDD, and SSD. The transmission unit 13 may include elements for generating a media file with a predetermined file format or elements for transmitting data through a broadcasting/communication network. The transmission unit 13 may be provided as a separate transmission device from the encoder 12. In this case, the transmission device may include at least one processor that acquires feature/feature map information or data output in the form of a bitstream and a transmission unit for transmitting it in the form of a file or streaming.

The decoding apparatus 20 may acquire feature/feature map information from the encoding apparatus 10 and reconstruct the feature/feature map based on the acquired information.

The decoding apparatus 20 may include a reception unit 21 and a decoding unit 22.

The reception unit 21 may receive a bitstream from the encoding apparatus 10, acquire feature/feature map information from the received bitstream, and send it to the decoding unit 22.

The decoding unit 22 may decode the feature/feature map based on the acquired feature/feature map information. The decoding unit 22 may perform a series of procedures such as dequantization, inverse transform, and prediction corresponding to the operation of the encoding unit 12 to increase decoding efficiency.

Depending on the embodiment, the decoding apparatus 20 may further include a task analysis/rendering unit 23.

The task analysis/rendering unit 23 may perform task analysis based on the decoded feature/feature map. Additionally, the task analysis/rendering unit 23 may render the decoded feature/feature map into a form suitable for task performance. Various machine (oriented) tasks may be performed based on task analysis results and the rendered features/feature map.

As described above, the VCM system may encode/decode the feature extracted from the source image/video according to user and/or machine requests, task purpose, and surrounding environment, and performs various machine (oriented) tasks based on the decoded feature. The VCM system may be implemented by expanding/redesigning the video/image coding system and may perform various encoding/decoding methods defined in the VCM standard.

VCM Pipeline

Figure 2:
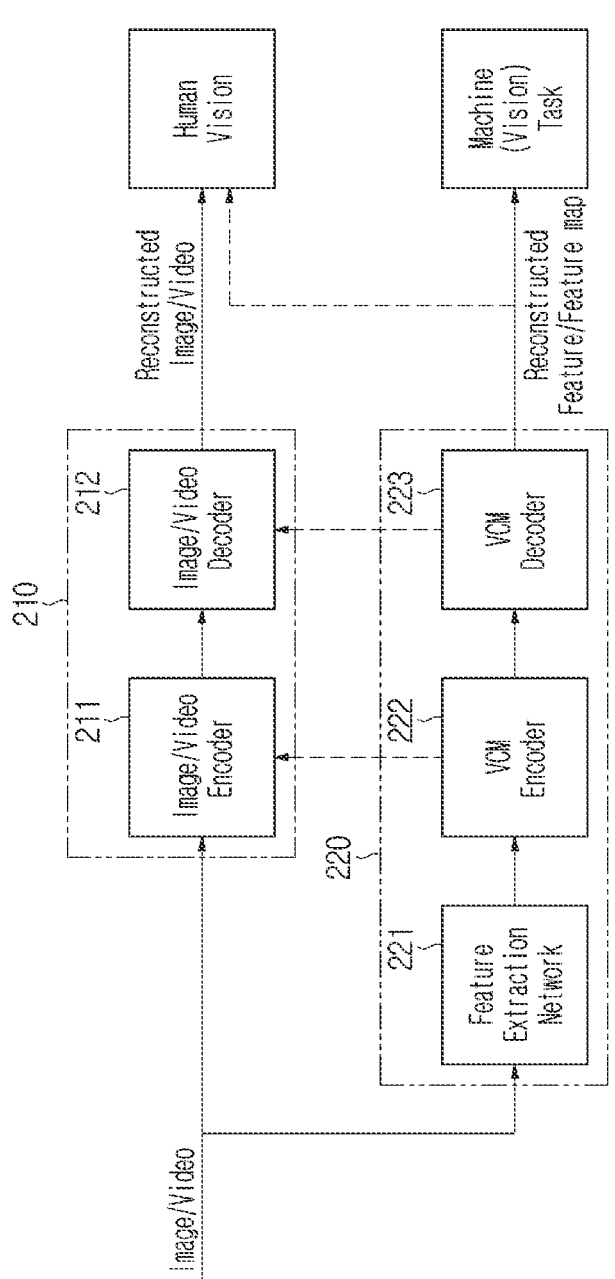
FIG. 2 is a diagram schematically showing a VCM pipeline structure to which embodiments of the present disclosure are applicable.

FIG. 2 is a diagram schematically showing a VCM pipeline structure to which embodiments of the present disclosure are applicable.

Referring to FIG. 2, the VCM pipeline 200 may include a first pipeline 210 for encoding/decoding an image/video and a second pipeline 220 for encoding/decoding a feature/feature map. In the present disclosure, the first pipeline 210 may be referred to as a video codec pipeline, and the second pipeline 220 may be referred to as a feature codec pipeline.

The first pipeline 210 may include a first stage 211 for encoding an input image/video and a second stage 212 for decoding the encoded image/video to generate a reconstructed image/video. The reconstructed image/video may be used for human viewing, that is, human vision.

The second pipeline 220 may include a third stage 221 for extracting a feature/feature map from the input image/video, a fourth stage 222 for encoding the extracted feature/feature map, and a fifth stage 223 for decoding the encoded feature/feature map to generate a reconstructed feature/feature map. The reconstructed feature/feature map may be used for a machine (vision) task. Here, the machine (vision) task may refer to a task in which images/videos are consumed by a machine. The machine (vision) task may be applied to service scenarios such as, for example, Surveillance, Intelligent Transportation. Smart City, Intelligent Industry, Intelligent Content, etc. Depending on the embodiment, the reconstructed feature/feature map may be used for human vision.

Depending on the embodiment, the feature/feature map encoded in the fourth stage 222 may be transferred to the first stage 221 and used to encode the image/video. In this case, an additional bitstream may be generated based on the encoded feature/feature map, and the generated additional bitstream may be transferred to the second stage 222 and used to decode the image/video.

Depending on the embodiment, the feature/feature map decoded in the fifth stage 223 may be transferred to the second stage 222 and used to decode the image/video.

FIG. 2 shows a case where the VCM pipeline 200 includes a first pipeline 210 and a second pipeline 220, but this is merely an example and embodiments of the present disclosure are not limited thereto. For example, the VCM pipeline 200 may include only the second pipeline 220, or the second pipeline 220 may be expanded into multiple feature codec pipelines.

Meanwhile, in the first pipeline 210, the first stage 211 may be performed by an image/video encoder, and the second stage 212 may be performed by an image/video decoder. Additionally, in the second pipeline 220, the third stage 221 may be performed by a VCM encoder (or feature/feature map encoder), and the fourth stage 222 may be performed by a VCM decoder (or feature/feature map encoder). Hereinafter, the encoder/decoder structure will be described in detail.

Encoder

Figure 3:
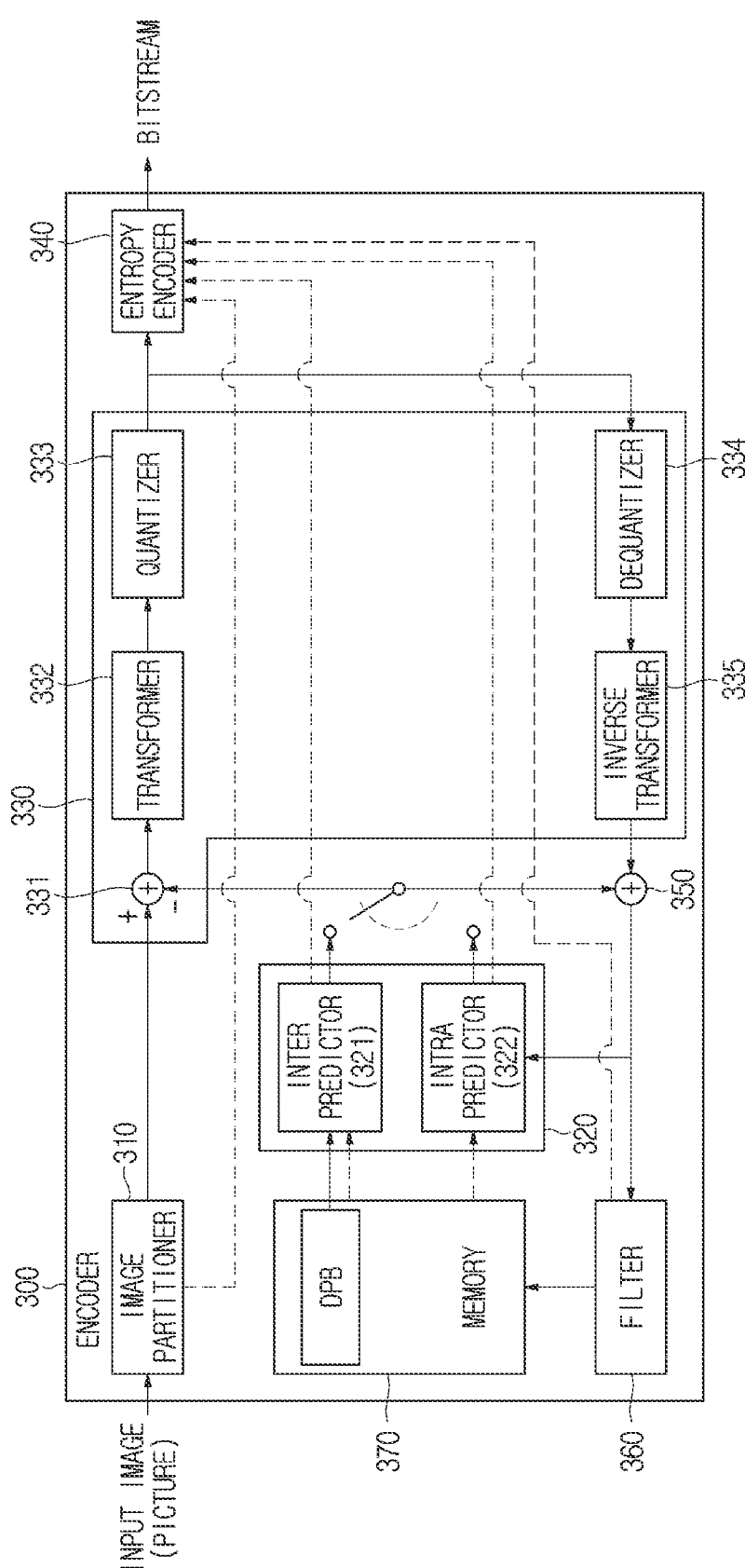
FIG. 3 is a diagram schematically showing an image/video encoder to which embodiments of the present disclosure are applicable.

FIG. 3 is a diagram schematically showing an image/video encoder to which embodiments of the present disclosure are applicable.

Referring to FIG. 3, the image/video encoder 300 may further include an image partitioner 310, a predictor 320, a residual processor 330, an entropy encoder 340, and an adder 350, a filter 360, and a memory 370. The predictor 320 may include an inter predictor 321 and an intra predictor 322. The residual processor 330 may include a transformer 332, a quantizer 333, a dequantizer 334, and an inverse transformer 335. The residual processor 330 may further include a subtractor 331. The adder 350 may be referred to as a reconstructor or a reconstructed block generator. The image partitioner 310, the predictor 320, the residual processor 330, the entropy encoder 340, the adder 350, and the filter 360 may be configured by one or more hardware components (e.g., encoder chipset or processor) depending on the embodiment. Additionally, the memory 370 may include a decoded picture buffer (DPB) and may be configured by a digital storage medium. The hardware components described above may further include a memory 370 as an internal/external component.

The image partitioner 310 may partition an input image (or picture, frame) input to the image/video encoder 300 into one or more processing units. As an example, the processing unit may be referred to as a coding unit (CU). The coding unit may be recursively partitioned according to a quad-tree binary-tree ternary-tree (QTBTTT) structure from a coding tree unit (CTU) or largest coding unit (LCU). For example, one coding unit may be partitioned into a plurality of coding units of deeper depth based on a quad tree structure, binary tree structure, and/or ternary structure. In this case, for example, the quad tree structure may be applied first and the binary tree structure and/or ternary structure may be applied later. Alternatively, the binary tree structure may be applied first. The image/video coding procedure according to the present disclosure may be performed based on a final coding unit that is no longer partitioned. In this case, the largest coding unit may be used as the final coding unit based on coding efficiency according to image characteristics, or, if necessary, the coding unit may be recursively partitioned into coding units of deeper depth to use a coding unit with an optimal size as the final coding unit. Here, the coding procedure may include procedures such as prediction, transform, and reconstruction, which will be described later. As another example, the processing unit may further include a prediction unit (PU) or a transform unit (TU) In this case, the prediction unit and the transform unit may each be divided or partitioned from the final coding unit described above. The prediction unit may be a unit of sample prediction, and the transform unit may be a unit for deriving a transform coefficient and/or a unit for deriving a residual signal from the transform coefficient.

In some cases, the unit may be used interchangeably with terms such as block or area. In a general case, an M×N block may represent a set of samples or transform coefficients consisting of M columns and N rows. A sample may generally represent a pixel or a pixel value, and may represent only a pixel/pixel value of a luma component, or only a pixel/pixel value of a chroma component. The sample may be used as a term corresponding to pixel or pel.

The image/video encoder 300 may generate a residual signal (residual block, residual sample array) by subtracting a prediction signal (predicted block, prediction sample array) output from the inter predictor 321 or the intra predictor 322 from the input image signal (original block, original sample array) and transmit the generated residual signal to the transformer 332. In this case, as shown, the unit that subtracts the prediction signal (prediction block, prediction sample array) from the input image signal (original block, original sample array) within the image/video encoder 300 may be referred to as the subtractor 331. The predictor may perform prediction on a processing target block (hereinafter referred to as a current block) and generate a predicted block including prediction samples for the current block. The predictor may determine whether intra prediction or inter prediction is applied in current block or CU units. The predictor may generate various information related to prediction, such as prediction mode information, and transfer it to the entropy encoder 340. Information about prediction may be encoded in the entropy encoder 340 and output in the form of a bitstream.

The intra predictor 322 may predict the current block by referring to the samples in the current picture. At this time, the referenced samples may be located in the neighbor of the current block or may be located away from the current block, depending on the prediction mode. In intra prediction, the prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on settings. The intra predictor 322 may determine the prediction mode applied to the current block by using a prediction mode applied to a neighboring block.

The inter predictor 321 may derive a predicted block for the current block based on a reference block (reference sample array) specified by a motion vector on a reference picture. In this case, in order to reduce the amount of motion information transmitted in the inter prediction mode, the motion information may be predicted in block, subblock, or sample units based on correlation of motion information between the neighboring block and the current block. The motion information may include a motion vector and a reference picture index. The motion information may further include inter prediction direction (L0 prediction, L1 prediction. Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a collocated CU (colCU), and the like, and the reference picture including the temporal neighboring block may be called a collocated picture (colPic). For example, the inter predictor 321 may construct a motion information candidate list based on neighboring blocks and generate information indicating which candidate is used to derive a motion vector and/or reference picture index of the current block. Inter prediction may be performed based on various prediction modes, and, for example, in the case of a skip mode and a merge mode, the inter predictor 321 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and a motion vector difference may be signaled to indicate the motion vector of the current block.

The predictor 320 may generate a prediction signal based on various prediction methods. For example, the predictor may not only apply intra prediction or inter prediction but also simultaneously apply both intra prediction and inter prediction, for prediction of one block. This may be called combined inter and intra prediction (CIIP). In addition, the predictor may be based on an intra block copy (IBC) prediction mode or a palette mode for prediction of the block. The IBC prediction mode or the palette mode may be used for content image/video coding of a game or the like, for example, screen content coding (SCC). IBC basically performs prediction within the current picture, but may be performed similarly to inter prediction in that a reference block is derived within the current picture. That is, IBC may use at least one of the inter prediction techniques described in the present disclosure. The palette mode may be regarded as an example of intra coding or intra prediction. When the palette mode is applied, the sample values within the picture may be signaled based on information about a palette table and a palette index.

The prediction signal generated by the predictor 320 may be used to generate a reconstructed signal or to generate a residual signal. The transformer 332 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT refers to transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to non-square blocks having a variable size.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may reorder quantized transform coefficients in a block form into a one-dimensional vector form based on a coefficient scan order and generate information on the quantized transform coefficients based on the quantized transform coefficients in the one-dimensional vector form. The entropy encoder 340 may perform various encoding methods such as, for example, exponential Golomb, context-adaptive variable length coding (CAVLC), context-adaptive binary arithmetic coding (CABAC), and the like. The entropy encoder 340 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In addition, the video/image information may further include a method of generating and using encoded information, a purpose, and the like. In the present disclosure, information and/or syntax elements transferred/signaled from the image/video encoder to the image/video decoder may be included in image/video information. The image/video information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD. CD, DVD, Blu-ray, HDD, SSD, and the like. A transmitter (not shown) transmitting a signal output from the entropy encoder 340 and/or a storage unit (not shown) storing the signal may be configured as internal/external element of the image/video encoder 300, or the transmitter may be included in the entropy encoder 340.

The quantized transform coefficients output from the quantizer 130 may be used to generate a prediction signal. For example, the residual signal (residual block or residual samples) may be reconstructed by applying dequantization and inverse transform to the quantized transform coefficients through the dequantizer 334 and the inverse transformer 335. The adder 350 adds the reconstructed residual signal to the prediction signal output from the inter predictor 321 or the intra predictor 322 to generate a reconstructed signal (reconstructed picture, reconstructed block, reconstructed sample array). In a case where there is no residual for the processing target block, such as a case where the skip mode is applied, the predicted block may be used as the reconstructed block. The adder 350 may be called a reconstructor or a reconstructed block generator. The generated reconstructed signal may be used for intra prediction of a next processing target block in the current picture and may be used for inter prediction of a next picture through filtering as described below.

Meanwhile, luma mapping with chroma scaling (LMCS) is applicable in a picture encoding and/or reconstruction process.

The filter 360 may improve subjective/objective image quality by applying filtering to the reconstructed signal. For example, the filter 360 may generate a modified reconstructed picture by applying various filtering methods to the reconstructed picture, and store the modified reconstructed picture in the memory 370, specifically, a DPB of the memory 370. The various filtering methods may include, for example, deblocking filtering, a sample adaptive offset, an adaptive loop filter, a bilateral filter, and the like. The filter 360 may generate various information related to filtering and transmit the generated information to the entropy encoder 190. The information related to filtering may be encoded by the entropy encoder 340) and output in the form of a bitstream.

The modified reconstructed picture transmitted to the memory 370 may be used as the reference picture in the inter predictor 321. Through this, prediction mismatch between the encoder and the decoder may be avoided and encoding efficiency may be improved.

The DPB of the memory 370 may store the modified reconstructed picture for use as a reference picture in the inter predictor 321. The memory 370 may store the motion information of the block from which the motion information in the current picture is derived (or encoded) and/or the motion information of the blocks in the already reconstructed picture. The stored motion information may be transferred to the inter predictor 321 for use as the motion information of the spatial neighboring block or the motion information of the temporal neighboring block. The memory 370 may store reconstructed samples of reconstructed blocks in the current picture and may transfer the stored reconstructed samples to the intra predictor 322.

Meanwhile, the VCM encoder (or feature/feature map encoder) basically performs a series of procedures such as prediction, transform, and quantization to encode the feature/feature map and thus may basically have the same/similar structure as the image/video encoder 300 described with reference to FIG. 3. However, the VCM encoder is different from the image/video encoder 300 in that the feature/feature map is an encoding target, and thus may be different from the image/video encoder 300 in the name of each unit (or component) (e.g., image partitioner 310, etc.) and its specific operation content. The specific operation of the VCM encoder will be described in detail later.

Decoder

Figure 4:
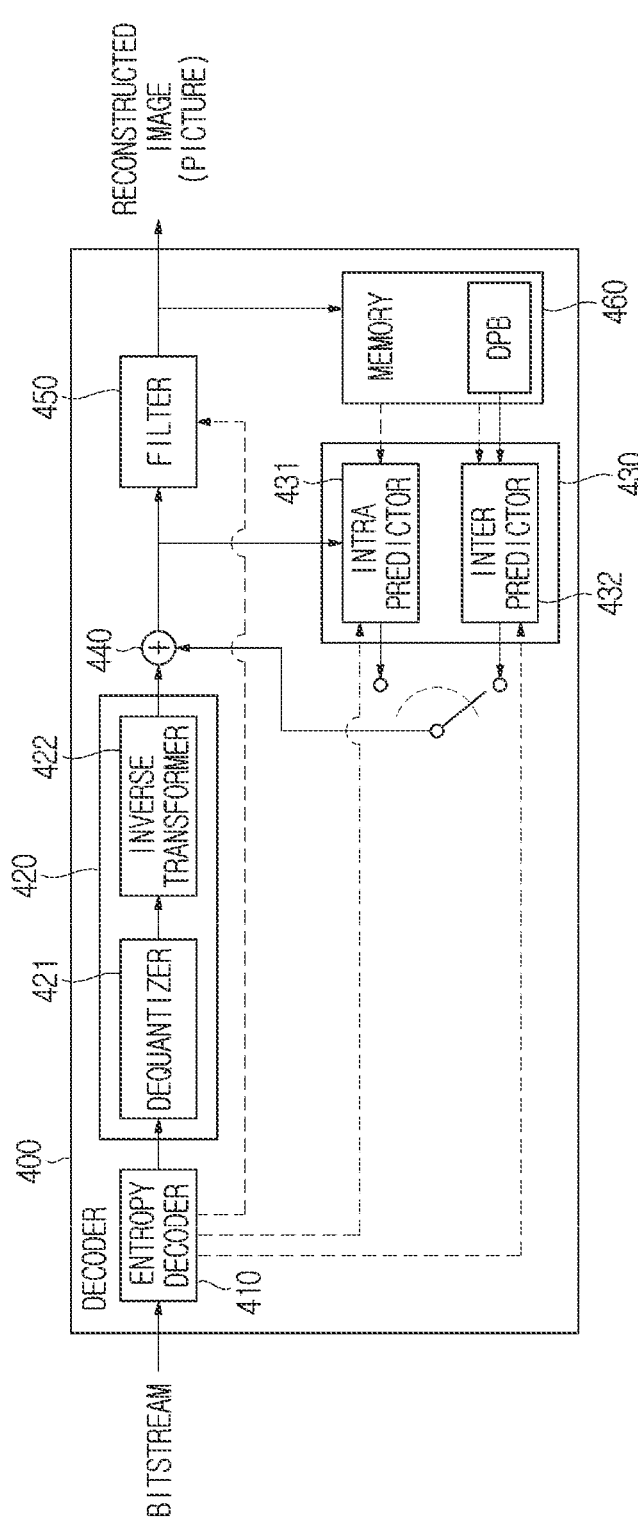
FIG. 4 is a diagram schematically showing an image/video decoder to which embodiments of the present disclosure are applicable.

FIG. 4 is a diagram schematically showing an image/video decoder to which embodiments of the present disclosure are applicable.

Referring to FIG. 4, the image/video decoder 400 may include an entropy decoder 410, a residual processor 420, a predictor 430, an adder 440, a filter 450 and a memory 460. The predictor 430 may include an inter predictor 431 and an intra predictor 432. The residual processor 420 may include a dequantizer 421 and an inverse transformer 422. The entropy decoder 410, the residual processor 420, the predictor 430, the adder 440, and the filter 450 may be configured by one hardware component (e.g., a decoder chipset or processor) depending on the embodiment. Additionally, the memory 460 may include a decoded picture buffer (DPB) and may be configured by a digital storage medium. The hardware component may further include the memory 460 as an internal/external component.

When a bitstream containing video/image information is input, the image/video decoder 400 may reconstruct an image/video in correspondence with the process in which the image/video information is processed in the image/video encoder 300 of FIG. 3. For example, the image/video decoder 400 may derive units/blocks based on block partition-related information acquired from the bitstream. The image/video decoder 400 may perform decoding using a processing unit applied in the image/video encoder. Accordingly, the processing unit of decoding may, for example, be a coding unit, and the coding unit may be partitioned from a coding tree unit or a largest coding unit according to a quad tree structure, a binary tree structure and/or a ternary tree structure. One or more transform units may be derived from the coding unit. In addition, the reconstructed image signal decoded and output through the image/video decoder 400 may be played through a playback device.

The image/video decoder 400 may receive a signal output from the encoder of FIG. 3 in the form of a bitstream, and decode the received signal through the entropy decoder 410. For example, the entropy decoder 410 may parse the bitstream to derive information (e.g., image/video information) necessary for image reconstruction (or picture reconstruction). The image/video information may further include information about various parameter sets, such as an adaptation parameter set (APS), picture parameter set (PPS), sequence parameter set (SPS), or video parameter set (VPS). Additionally, image/video information may further include general constraint information. Additionally, the image/video information may include a method of generating and using decoded information, a purpose, and the like. The image/video decoder 400 may decode the picture further based on information about the parameter set and/or general constraint information. The signaled/received information and/or syntax elements may be decoded and acquired from the bitstream through a decoding procedure. For example, the entropy decoder 410 may decode information in the bitstream based on a coding method such as exponential Golomb coding, CAVLC, or CABAC, and output the values of syntax elements necessary for image reconstruction and quantized values of transform coefficients related to residuals. More specifically, in the CABAC entropy decoding method, a bin corresponding to each syntax element may be received in the bitstream, a context model may be determined using decoding target syntax element information and decoding information of neighboring and decoding target blocks or information on the symbol/bin decoded in the previous step, the occurrence probability of the bin may be predicted according to the determined context model, and arithmetic decoding of the bin may be performed to generate a symbol corresponding to the value of each syntax element. At this time, the CABAC entropy decoding method may update the context model using the information on the decoded symbol/bin for the context model of the next symbol/bin after determining the context model. Information about prediction among the information decoded in the entropy decoder 410 is provided to the predictor (inter predictor 432 and intra predictor 431), and a residual value obtained by performing entropy decoding in the entropy decoder 410, that is, quantized transform coefficients and related parameter information may be input to the residual processor 420. The residual processor 420 may derive a residual signal (residual block, residual samples, residual sample array). Additionally, information about filtering among the information decoded by the entropy decoder 410 may be provided to the filter 450. Meanwhile, a receiver (not shown) that receives a signal output from the image/video encoder may be further configured as an internal/external element of the image/video decoder 400, or the receiver may be a component of the entropy decoder 410. Meanwhile, the image/video decoder according to the present disclosure may be called an image/video decoding apparatus, and the image/video decoder may be divided into an information decoder (image/video information decoder) and a sample decoder (image/video sample decoder). In this case, the information decoder may include an entropy decoder 410, and the sample decoder may include at least one of a dequantizer 321, an inverse transformer 322, an adder 440, a filter 450, and a memory 460, an inter predictor 432 or an intra predictor 431.

The dequantizer 421 may dequantize the quantized transform coefficients and output transform coefficients. The dequantizer 421 may rearrange the quantized transform coefficients into a two-dimensional block form. In this case, rearranging may be performed based on the coefficient scan order performed in the image/video encoder. The dequantizer 321 may perform dequantization on quantized transform coefficients using quantization parameters (e.g., quantization step size information) and acquire transform coefficients.

The inverse transformer 422 inversely transforms the transform coefficients to acquire a residual signal (residual block, residual sample array).

The predictor 430 may perform prediction on the current block and generate a predicted block including prediction samples for the current block. The predictor may determine whether intra prediction or inter prediction is applied to the current block based on information about prediction output from the entropy decoder 410, and may determine a specific intra/inter prediction mode.

The predictor 420 may generate a prediction signal based on various prediction methods. For example, the predictor may not only apply intra prediction or inter prediction for prediction of one block, but also may apply intra prediction and inter prediction simultaneously. This may be called combined inter and intra prediction (CHIP). Additionally, the predictor may be based on an intra block copy (IBC) prediction mode or a palette mode for prediction of a block. The IBC prediction mode or palette mode may be used, for example, for image/video coding of content such as games, such as screen content coding (SCC). In IBC, prediction is basically performed within the current picture, but may be performed similarly to inter prediction in that a reference block is derived within the current picture. That is. IBC may use at least one of the inter prediction techniques described in this document. The palette mode may be viewed as an example of intra coding or intra prediction. When the palette mode is applied, information about the palette table and palette index may be included and signaled in the image/video information.

The intra predictor 431 may predict the current block by referencing samples in the current picture. The referenced samples may be located in the neighbor of the current block, or may be located away from the current block, depending on the prediction mode. In intra prediction, prediction modes may include a plurality of non-directional modes and a plurality of directional modes. The intra predictor 431 may determine the prediction mode applied to the current block using the prediction mode applied to the neighboring block.

The inter predictor 432 may derive a predicted block for the current block based on a reference block (reference sample array) specified by a motion vector in the reference picture. At this time, in order to reduce the amount of motion information transmitted in the inter prediction mode, motion information may be predicted in block, subblock, or sample units based on the correlation of motion information between the neighboring block and the current block. The motion information may include a motion vector and a reference picture index. The motion information may further include inter prediction direction (L0 prediction, L1 prediction. Bi prediction, etc.) information. In the case of inter prediction, neighboring blocks may include a spatial neighboring block present in the current picture and a temporal neighboring block present in the reference picture. For example, the inter predictor 432 may construct a motion information candidate list based on neighboring blocks and derive a motion vector and/or reference picture index of the current block based on received candidate selection information. Inter prediction may be performed based on various prediction modes, and information about prediction may include information indicating the mode of inter prediction for the current block.

The adder 440 may generate a reconstructed signal (reconstructed picture, reconstructed block, reconstructed sample array) by adding the acquired residual signal to a prediction signal (predicted block, prediction sample array) output from the predictor (including the inter predictor 432 and/or the intra predictor 431). If there is no residual for a processing target block, such as when skip mode is applied, the predicted block may be used as a reconstruction block.

The adder 440 may be called a reconstructor or a reconstruction block generator. The generated reconstructed signal may be used for intra prediction of a next processing target block in the current picture, may be output after filtering as described later, or may be used for inter prediction of a next picture.

Meanwhile, luma mapping with chroma scaling (LMCS) is applicable in a picture decoding process.

The filter 450 can improve subjective/objective image quality by applying filtering to the reconstructed signal. For example, the filter 450 may generate a modified reconstructed picture by applying various filtering methods to the reconstructed picture, and transmit the modified reconstructed picture in the memory 460, specifically the DPB of the memory 460. Various filtering methods may include, for example, deblocking filtering, sample adaptive offset, adaptive loop filter, bilateral filter, etc.

The (modified) reconstructed picture stored in the DPB of the memory 460 may be used as a reference picture in the inter predictor 432. The memory 460 may store motion information of a block from which motion information in the current picture is derived (or decoded) and/or motion information of blocks in an already reconstructed picture. The stored motion information may be transferred to the inter predictor 432 for use as motion information of spatial neighboring blocks or motion information of temporal neighboring blocks. The memory 460 may store reconstructed samples of reconstructed blocks in the current picture and transfer them to the intra predictor 431.

Meanwhile, the VCM decoder (or feature/feature map decoder) performs a series of procedures such as prediction, inverse transform, and dequantization to decode the feature/feature map, and may basically have the same/similar structure as the image/video decoder 400 described above with reference to FIG. 4. However, the VCM decoder is different from the image/video decoder 400 in that the feature/feature map is a decoding target, and may be different from the image/video decoder 400 in the name (e.g., DPB, etc.) of each unit (or component) and its specific operation. The operation of the VCM decoder may correspond to the operation of the VCM encoder, and the specific operation will be described in detail later.

Feature/Feature Map Encoding Procedure

Figure 5:
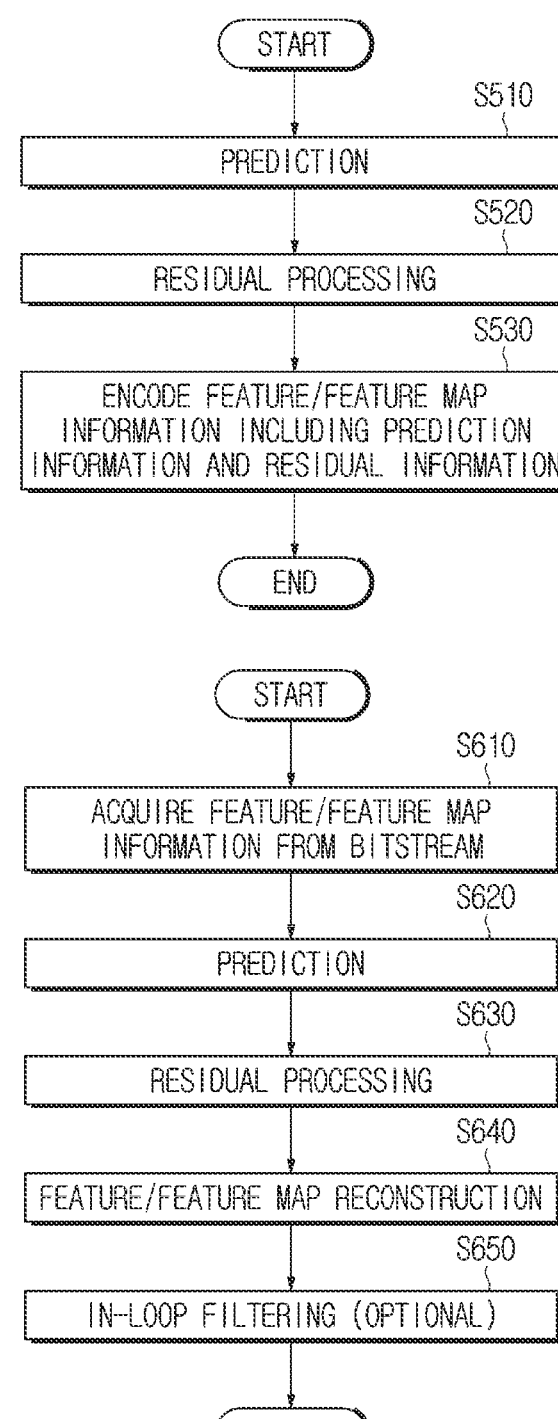
FIG. 5 is a flowchart schematically illustrating a feature/feature map encoding procedure to which embodiments of the present disclosure are applicable.

FIG. 5 is a flowchart schematically illustrating a feature/feature map encoding procedure to which embodiments of the present disclosure are applicable.

Referring to FIG. 5, the feature/feature map encoding procedure may include a prediction procedure (S510), a residual processing procedure (S520), and an information encoding procedure (S530).

The prediction procedure (S510) may be performed by the predictor 320 described above with reference to FIG. 3.

Specifically, the intra predictor 322 may predict a current block (that is, a set of current encoding target feature elements) by referencing feature elements in a current feature/feature map. Intra prediction may be performed based on the spatial similarity of feature elements constituting the feature/feature map. For example, feature elements included in the same region of interest (RoI) within an image/video may be estimated to have similar data distribution characteristics. Accordingly, the intra predictor 322 may predict the current block by referencing the already reconstructed feature elements within the region of interest including the current block. At this time, the referenced feature elements may be located adjacent to the current block or may be located away from the current block depending on the prediction mode. Intra prediction modes for feature/feature map encoding may include a plurality of non-directional prediction modes and a plurality of directional prediction modes. The non-directional prediction modes may include, for example, prediction modes corresponding to the DC mode and planar mode of the image/video encoding procedure. Additionally, the directional modes may include prediction modes corresponding to, for example, 33 directional modes or 65 directional modes of an image/video encoding procedure. However, this is an example, and the type and number of intra prediction modes may be set/changed in various ways depending on the embodiment.

The inter predictor 321 may predict the current block based on a reference block (i.e., a set of referenced feature elements) specified by motion information on the reference feature/feature map Inter prediction may be performed based on the temporal similarity of feature elements constituting the feature/feature map. For example, temporally consecutive features may have similar data distribution characteristics. Accordingly, the inter predictor 321 may predict the current block by referencing the already reconstructed feature elements of features temporally adjacent to the current feature. At this time, motion information for specifying the referenced feature elements may include a motion vector and a reference feature/feature map index. The motion information may further include information about an inter prediction direction (e.g., L0 prediction, L1 prediction, Bi prediction, etc.). In the case of inter prediction, neighboring blocks may include spatial neighboring blocks present within the current feature/feature map and temporal neighboring blocks present within the reference feature/feature map. A reference feature/feature map including a reference block and a reference feature/feature map including a temporal neighboring block may be the same or different. The temporal neighboring block may be referred to as a collocated reference block, etc., and a reference feature/feature map including a temporal neighboring block may be referred to as a collocated feature/feature map. The inter predictor 321 may construct a motion information candidate list based on neighboring blocks and generate information indicating which candidate is used to derive the motion vector and/or reference feature/feature map index of the current block. Inter prediction may be performed based on various prediction modes. For example, in the case of the skip mode and the merge mode, the inter predictor 321 may use motion information of the neighboring block as motion information of the current block. In the case of the skip mode, unlike the merge mode, the residual signal may not be transmitted. In the case of the motion vector prediction (MVP) mode, the motion vector of the neighboring block is used as a motion vector predictor, and the motion vector of the current block may be indicated by signaling the motion vector difference. The predictor 320 may generate a prediction signal based on various prediction methods in addition to intra prediction and inter prediction described above.

The prediction signal generated by the predictor 320 may be used to generate a residual signal (residual block, residual feature elements) (S520). The residual processing procedure (S520) may be performed by the residual processor 330 described above with reference to FIG. 3. In addition, (quantized) transform coefficients may be generated through a transform and/or quantization procedure for the residual signal, and the entropy encoder 340 may encode information about the (quantized) transform coefficients in the bitstream as residual information (S530). Additionally, the entropy encoder 340 may encode information necessary for feature/feature map reconstruction, such as prediction information (e.g., prediction mode information, motion information, etc.), in the bitstream, in addition to the residual information.

Meanwhile, the feature/feature map encoding procedure may further include not only a procedure (S530) for encoding information for feature/feature map reconstruction (e.g., prediction information, residual information, partitioning information, etc.) and outputting it in the form of a bitstream, a procedure for generating a reconstructed feature/feature map for the current feature/feature map and a procedure (optional) for applying in-loop filtering to the reconstructed feature/feature map.

The VCM encoder may derive (modified) residual feature(s) from the quantized transform coefficient(s) through dequantization and inverse transform, and generate a reconstructed feature/feature map based on the predicted feature(s) and (modified) residual feature(s) that are the output of step S510. The reconstructed feature/feature map generated in this way may be the same as the reconstructed feature/feature map generated in the VCM decoder. When an in-loop filtering procedure is performed on the reconstructed feature/feature map, a modified reconstructed feature/feature map may be generated through the in-loop filtering procedure on the reconstructed feature/feature map. The modified reconstructed feature/feature map may be stored in a decoded feature buffer (DFB) or memory and used as a reference feature/feature map in the feature/feature map prediction procedure later. Additionally, (in-loop) filtering-related information (parameters) may be encoded and output in the form of a bitstream. Through the in-loop filtering procedure, noise that may occur during feature/feature map coding may be removed, and feature/feature map-based task performance may be improved. In addition, by performing an in-loop filtering procedure at both the encoder stage and the decoder stage, the identity of the prediction result can be guaranteed, the reliability of feature/feature map coding can be improved, and the amount of data transmission for feature/feature map coding can be reduced Feature/Feature Map Decoding Procedure FIG. 6 is a flowchart schematically illustrating a feature/feature map decoding procedure to which embodiments of the present disclosure are applicable.

Referring to FIG. 6, the feature/feature map decoding procedure may include an image/video information acquisition procedure (S610), a feature/feature map reconstruction procedure (S620 to S640), and an in-loop filtering procedure for a reconstructed feature/feature map (S650). The feature/feature map reconstruction procedure may be performed on the prediction signal and residual signal acquired through inter/intra prediction (S620) and residual processing (S630), dequantization and inverse transform process for quantized transform coefficients described in the present disclosure. A modified reconstructed feature/feature map may be generated through an in-loop filtering procedure for the reconstructed feature/feature map, and the modified reconstructed feature/feature map may be output as a decoded feature/feature map. The decoded feature/feature map may be stored in a decoded feature buffer (DFB) or memory and used as a reference feature/feature map in the inter prediction procedure when decoding the feature/feature map. In some cases, the above-described in-loop filtering procedure may be omitted. In this case, the reconstructed feature/feature map may be output without change as a decoded feature/feature map, and stored in the decoded feature buffer (DFB) or memory, and then be used as a reference feature/feature map in the inter prediction procedure when decoding the feature/feature map.

Feature Extraction Method and Data Distribution Characteristics

Embodiments of the present disclosure propose a filtering process for compensating for reduction in information amount due to compression of an activation (feature) map generated in a hidden layer of a deep neural network, and a method of generating a related bitstream.

Input data input to the deep neural network goes through an operation process of several hidden layers, and the operation results of each hidden layer are output as a feature/feature map having various sizes and channel numbers depending on the type of deep neural network being used and the location of the hidden layer within the deep neural network.

Figures 7, 8, 9:
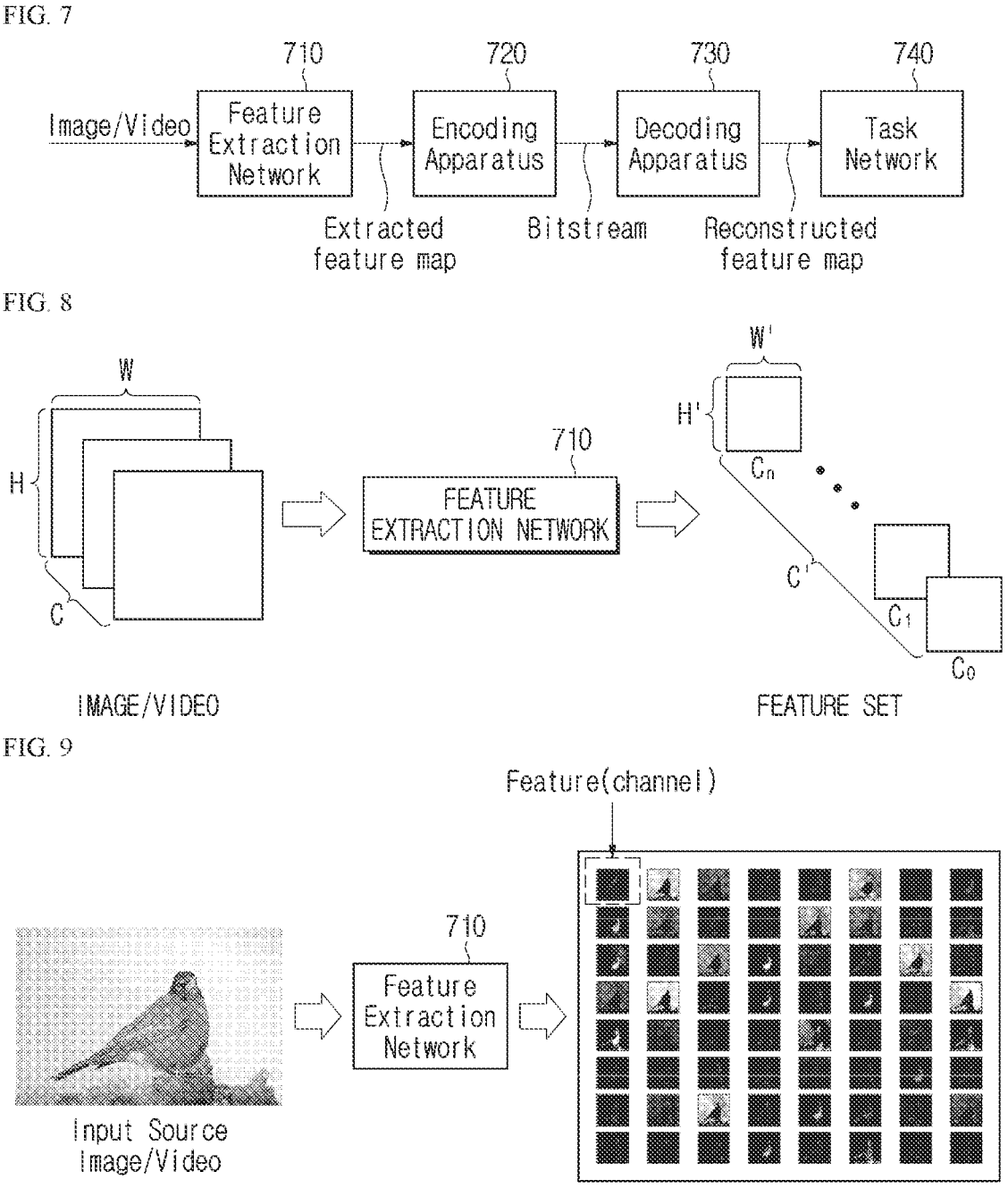
FIG. 7 is a diagram showing an example of a feature extraction and reconstruction method to which embodiments of the present disclosure are applicable.
FIG. 8 is a diagram illustrating an example of a feature extraction method using a feature extraction network.
FIG. 9 is a diagram showing an example of an extracted feature.

FIG. 7 is a diagram showing an example of a feature extraction and reconstruction method to which embodiments of the present disclosure are applicable.

Referring to FIG. 7, a feature extraction network 710 may extract a middle-layer activation (feature) map of a deep neural network from a source image/video and output the extracted feature map. The feature extraction network 710 may be a set of successive hidden layers from the input of the deep neural network.

An encoding apparatus 720 may compress the output feature map and output it in the form of a bitstream, and a decoding apparatus 730 may reconstruct the (compressed) feature map from the output bitstream. The encoding apparatus 720 may correspond to the encoding unit 12 of FIG. 1, and the decoding apparatus 720 may correspond to the decoding unit 22 of FIG. 1. The task network 740 may perform a task based on the reconstructed feature map.

FIG. 8 is a diagram illustrating an example of a feature extraction method using a feature extraction network 710.

Referring to FIG. 8, the feature extraction network 710 may receive a video source and perform a feature extraction operation to output a feature set of the video source. The feature set may include a plurality of features $C_0, C_1, \ldots, C_n$ extracted from the video source, and may be expressed as a feature map. Each feature $C_0, C_1, \ldots, C_n$ includes a plurality of feature elements and may have different data distribution characteristics.

In FIG. 8, W, H, and C may mean the width, height, and number of channels of the video source, respectively. Here, the number C of channels of the video source may be determined based on the image format of the video source. For example, when the video source has an RGB image format, the number C of channels of the video source may be 3.

Additionally, W', H', and C' may mean the width, height, and number of channels of the feature set, respectively. The number C' of channels of the feature set may be equal to the total number (n+1) of features $C_0, C_1, \ldots, C_n$ extracted from the video source. In one example, the number C' of channels of the feature set may be greater than the number C of channels of the video source.

The properties W', H', C' of the feature set may vary depending on the properties W, H. C of the video source. For example, as the number C of channels of the video source increases, the number C' of channels of the feature set may also increase. Additionally, the properties W', H', C' of the feature set may vary depending on the type and properties of the feature extraction network 710. For example, if the feature extraction network 710 is implemented as an artificial neural network (e.g., CNN, DNN, etc.), the properties W', H', C' of the feature set may also vary according to the location of the layer outputting each feature $C_0, C_1, \ldots, C_n$.

The video source and the feature set may have different data distribution characteristics. For example, the video source may generally consist of one (grayscale image) channel or three (RGB image) channels. Pixels included in the video source may have the same integer value range for all channels and may have non-negative values. Additionally, each pixel value may be evenly distributed within a predetermined integer value range. On the other hand, the feature set may be composed of a various number of channels (e.g., 32, 64, 128, 256, 512, etc.) depending on the type of feature extraction network 710 (e.g., CNN, DNN, etc.) and layer location. Feature elements included in the feature set may have different real value ranges for each channel and may also have negative values. Additionally, each feature element value may be intensively distributed in a specific area within a predetermined real value range.

Figure 10:
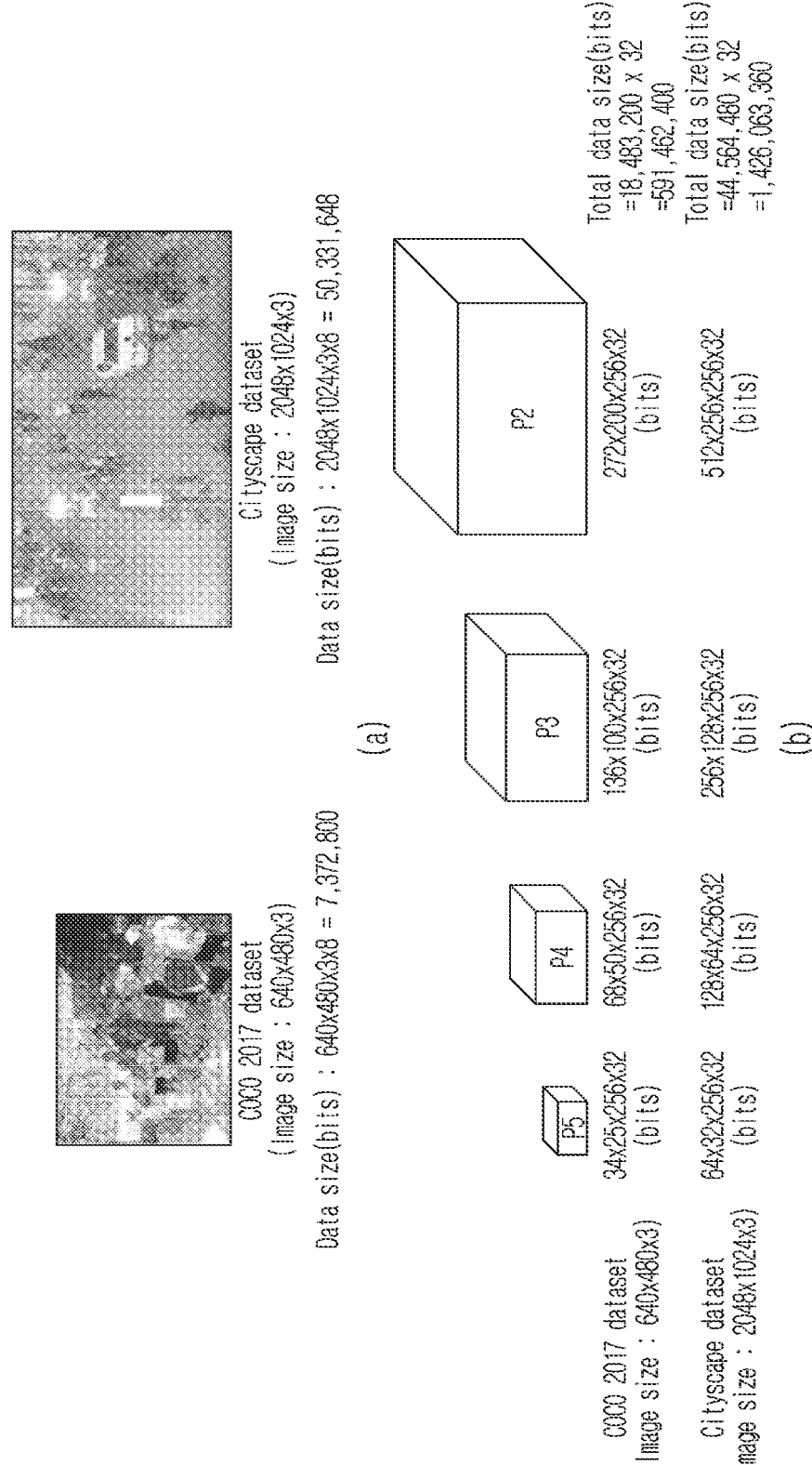
FIG. 10 is a diagram showing an example of the size of an extracted feature set.

FIG. 9 is a diagram showing an example of an extracted feature, and FIG. 10 is a diagram showing an example of the size of an extracted feature set.

The left side of FIG. 9 shows a video source (Image/Video), and the right side of FIG. 9 shows a feature map with 64 features. Referring to FIG. 9, it can be seen that 64 features (channels) are extracted from one video source. Additionally, it can be seen that the width and height of each feature is also different from the width and height of the video source. Typically, the size (width×height) of a single feature is smaller than the size of the video source, but since the number of channels in the feature is greater than the number of channels in the video source, the sum of the sizes of all features may be larger than the size of the video source.

(a) of FIG. 10 shows the size of the video source (Image/Video), and (b) of FIG. 10 shows a feature map with the number of channels being 256. Referring to FIG. 10, it can be seen that although the size of an individual feature is smaller than that of the video source, the total size (size of the feature map) is larger than that of the video source due to an increase in the number of channels.

Figures 11, 12:
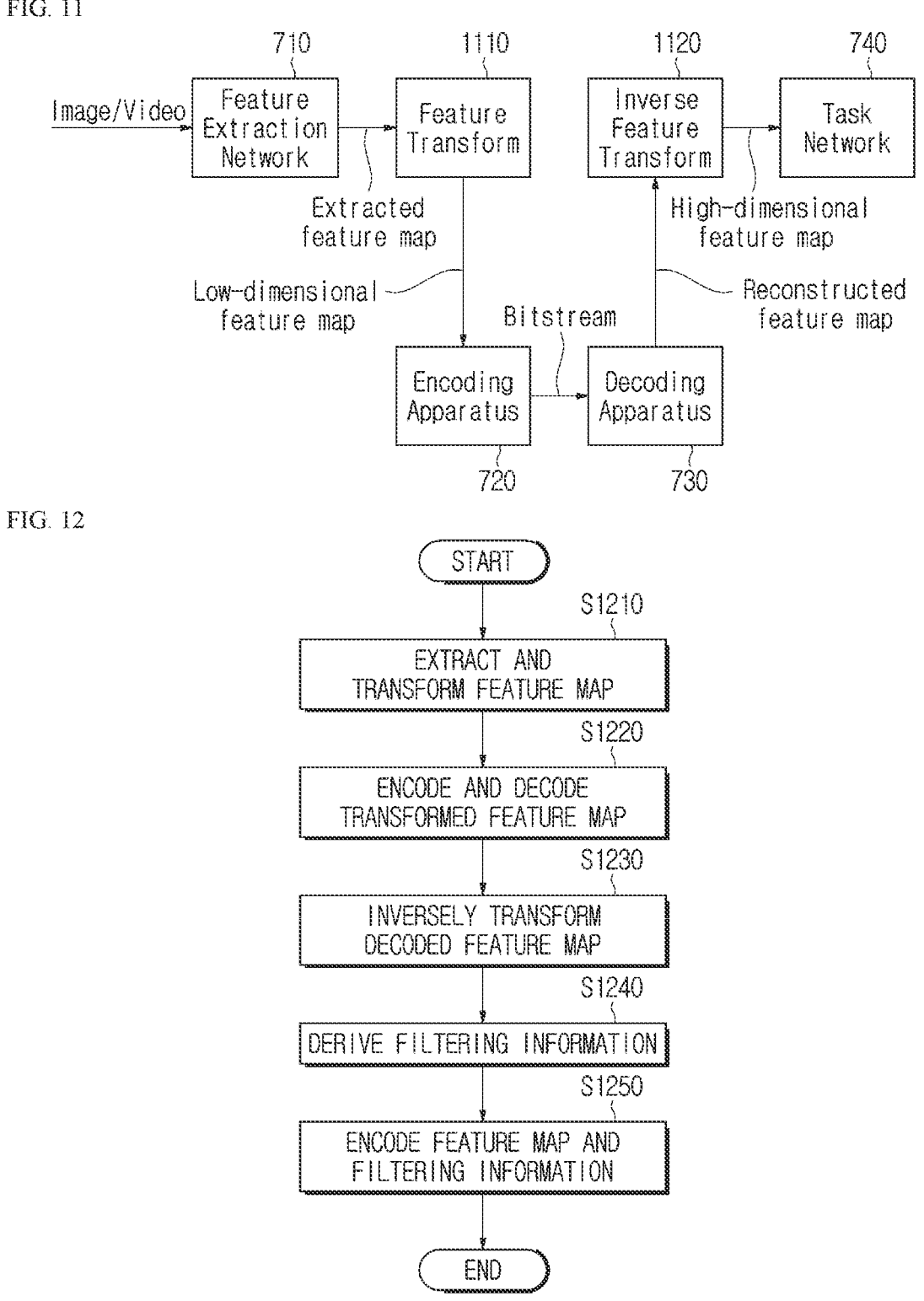
FIG. 11 is a diagram showing an example of a feature extraction and reconstruction method to which embodiments of the present disclosure are applicable.
FIG. 12 is a flowchart illustrating a feature encoding method according to an embodiment of the present disclosure.

In order to efficiently compress the feature or feature map, a method of efficiently reducing the size of the feature map may be applied. Feature map transform (or feature dimension transform) may be used as a method of reducing the size of the feature map, and an example of a method of reducing the size of the feature map through feature dimension transform is shown in FIG. 11.

A feature transform unit 1110 transforms the extracted feature map output from a feature extraction network 710 into a low-dimensional feature map, and an encoding apparatus 720 may encode the low-dimensional feature map and output it in the form of a bitstream. A decoding apparatus 730 may decode the low-dimensional feature map from the bitstream, and a feature inverse transform unit 1120 may inversely transform the low-dimensional feature map into a high-dimensional feature map. The function of the feature transform unit 1120 may be to reconstruct the low-dimensional feature map to the high-dimensional feature map and output a reconstructed feature map. Here, the dimension of the reconstructed feature map may be the same as the dimension before being input to the feature extraction network 710.

However, in a process of applying the above method (i.e., feature dimension transform) of simply transforming the dimension of the feature map into a low dimension and then inversely transforming it into a high dimension, information loss may occur. In addition, even if the low-dimensional feature map is reconstructed to a high-dimensional feature map due to information loss, the accuracy of the reconstructed feature map (feature map inversely transformed into the high dimension) is not maintained, and as a result, compression efficiency may be reduced.

The present disclosure proposes embodiments of minimizing a difference (or error) between the feature map before application of the feature dimension transform technology and the reconstructed feature map.

Embodiment 1

Figure 14:
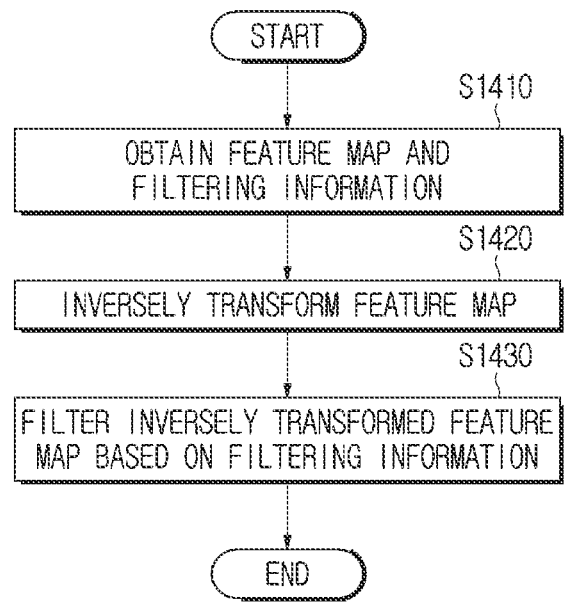
FIG. 14 is a flowchart illustrating a feature decoding method according to an embodiment of the present disclosure.

Embodiment 1 is an embodiment of a filtering method for compensating for information lost in a process of reducing a dimension of a feature map. FIG. 12 is a flowchart illustrating a feature encoding method according to an embodiment of the present disclosure, and FIG. 14 is a flowchart illustrating a feature decoding method according to an embodiment of the present disclosure.

Referring to FIG. 12, the feature encoding apparatus 10 may extract a feature map from an image and transform the extracted feature map into a low dimension (S1210). That is, the feature encoding apparatus 10 may derive the transformed feature map based on the extracted feature map.

The feature encoding apparatus 10 may encode the transformed feature map and decode it again (S1220), and may inversely transform the decoded feature map (S1230) to derive the inversely transformed feature map. That is, the feature encoding apparatus 10 may derive the inversely transformed feature map based on the transformed feature map.

The feature encoding apparatus 10 may derive filtering information based on the inversely transformed feature map (S1240) and encode the transformed feature map and the derived filtering information (S1250). The filtering information may include information specifying whether filtering is applied and a filter parameter used to perform filtering.

Various filters may be used as filters applied to filtering. For example, Sample Adaptive Offset (SAO), Adaptive Loop Filter (ALF), Cross Component ALF (CCALF), etc. may be applied to filtering.

In VVC, an in-loop filter to compensate for a difference between an original picture and a reconstructed picture that occurs during an encoding/decoding process is used.

Among in-loop filters, an ALF is technology of performing compensation in pixel units so that a reconstructed picture has a value close to that of an original picture, by determining information such as whether to apply the ALF, an ALF shape, and an ALF parameter through comparison between the original picture and the reconstructed picture and then signaling and applying it to the reconstructed picture. This is because the ALF is based on the Wiener Filter, which makes the original picture and the reconstructed picture similar.

Figure 13:
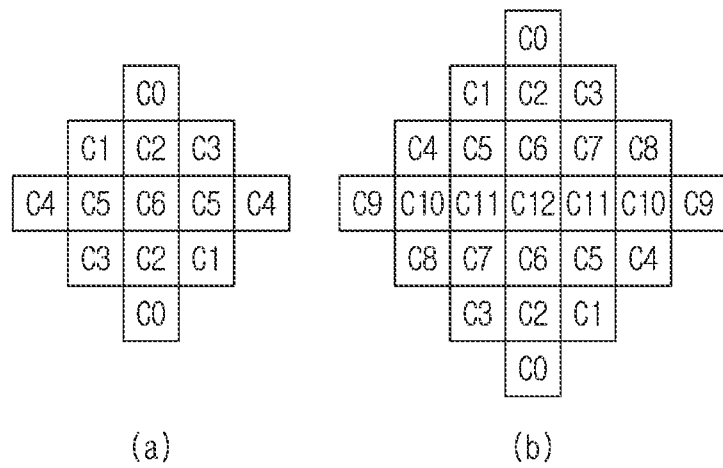
FIG. 13 is a diagram showing an example of a filter shape which may be used for error compensation.

An example of the shape of ALF filter that may be used for error compensation is shown in FIG. 13. (a) of FIG. 13 shows an ALF filter in a 5×5 diamond shape, and (b) of FIG. 13 shows an ALF filter in a 7×7 diamond shape.

In the present disclosure, information such as whether to apply the ALF, the unit for determining whether to apply it, filter shape, filter parameter, etc. may be determined independently of VVC. In particular, the ALF filter shape shown as an example in FIG. 13 is applicable to a luminance component/chrominance component, and in the present disclosure, considering that the feature map is composed of a plurality of channels, a filter with a different shape from that of FIG. 13 is used. In this case, the shape of the filter applied to each feature may differ depending on the characteristics of the feature, and the filter with the same shape may be applied to all features. Since the filter parameter is information to minimize errors, it may be generated differently for each filter application unit.

CCALF is a method of applying an ALF by utilizing a correlation between a luminance component and a chrominance component. Therefore, when applying CCALF as a feature map target, a CCALF parameter may be generated using the correlation between feature channels and applied to filtering.

Referring to FIG. 14, the feature decoding apparatus 20 may obtain a feature map (transformed into a low dimension) and filtering information from a bitstream (S1410). In addition, the feature decoding apparatus 20 may inversely transform the feature map into a high dimension (S1420), and filter the feature map inversely transformed into the high dimension based on the filtering information (S1430), thereby compensating for errors due to dimension transform.

Meanwhile, since filtering (first filtering) is also performed in the existing encoding/decoding process, complexity may increase if additional filtering (second filtering) for compensating for information loss due to dimensional transform is applied after performing the first filtering. The existing encoding/decoding process may be a filtering process performed in the encoding apparatus 720 and the decoding apparatus 730 of FIG. 11.

To solve this problem, the present disclosure proposes a method of integrating two filtering processes into one. That is, without performing first filtering, filtering (second filtering) may be applied only to the feature map that has been inversely transformed into the high dimension (with a reconstructed dimension). In this case, the filter parameter required for the first filtering process and the filter parameter required for the second filtering process may be integrated into one.

Embodiment 2

Embodiment 2 is an embodiment of a method of deriving information necessary for applying second filtering. Embodiment 2 may be divided into the following embodiments according to the feature map used to derive filtering information.

Embodiment 2-1

Embodiment 2-1 is a method of generating filtering information based on a feature map extracted from the feature extraction network 1110 and a feature map transformed into a low dimension.

Figures 15, 16:
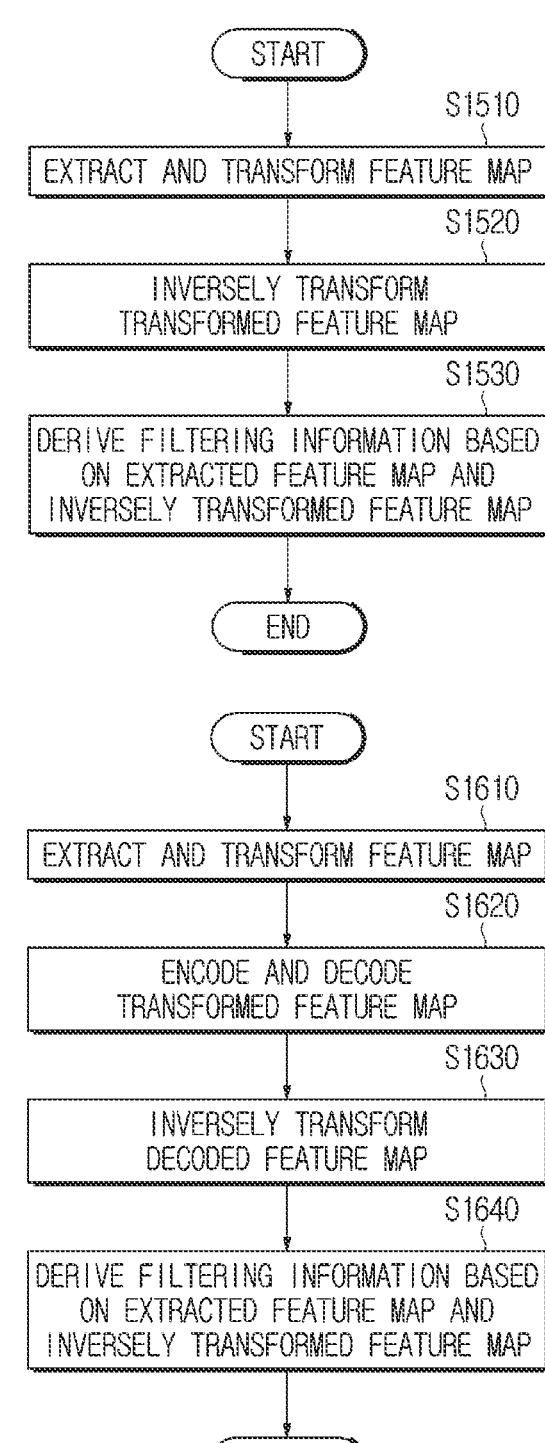
FIGS. 15 and 16 are flowcharts illustrating feature encoding methods according to an embodiment of the present disclosure.
Figure 17:
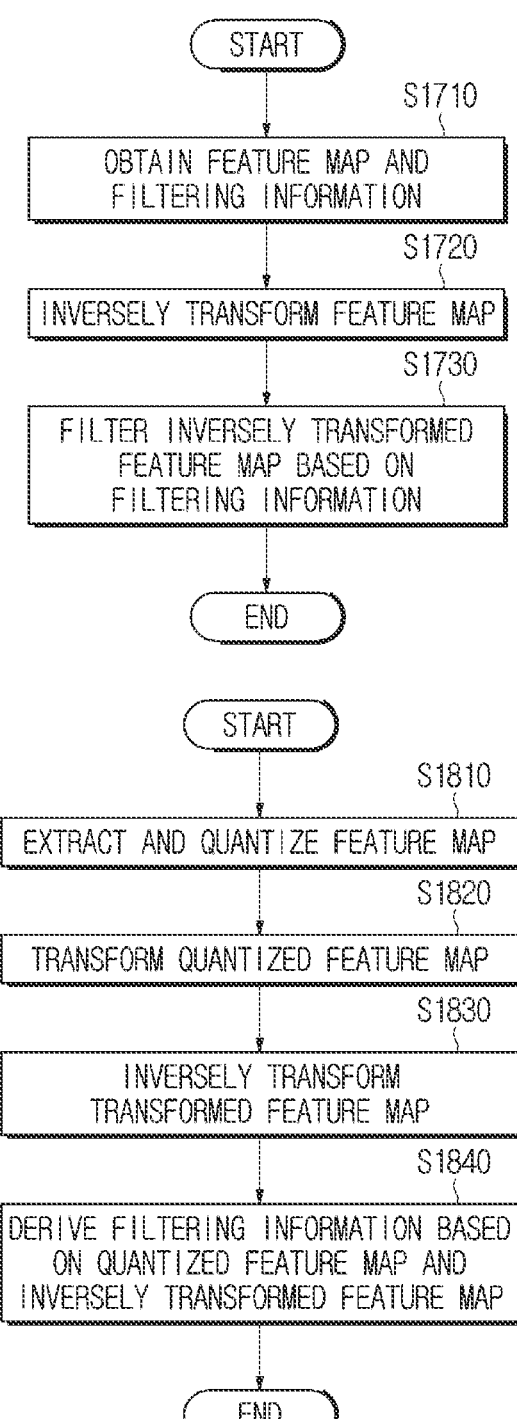
FIG. 17 is a flowchart illustrating a feature decoding method according to an embodiment of the present disclosure.

FIG. 15 is a flowchart illustrating feature encoding methods according to Embodiment 2-1, and FIG. 17 is a flowchart illustrating a feature decoding method according to Embodiment 2-1.

Referring to FIG. 15, the feature encoding apparatus 10 may extract a feature map from an image and transform the extracted feature map into a low dimension (S1510). That is, the feature encoding apparatus 10 may derive the transformed feature map based on the extracted feature map.

The feature encoding apparatus 10 may inversely transform the transformed feature map into a high dimension (the same dimension as the extracted feature map) (S1520), and may derive filtering information based on the extracted feature map and the inversely transformed feature map (S1530).

Referring to FIG. 17, the feature decoding apparatus 20 may obtain a feature map (transformed into a low dimension) and filtering information from a bitstream (S1710). In addition, the feature decoding apparatus 20 may inversely transform the feature map into a high dimension (S1720), and filter the feature map inversely transformed into the high dimension based on filtering information (S1730), thereby compensating for errors due to dimension transform.

According to Embodiment 2-1, since the filtering information may be derived only through the feature map transform and inverse transform processes, the complexity of the process of deriving filtering information can be reduced.

Embodiment 2-2

Embodiment 2-2 is a method of generating filtering information based on a feature map extracted from the feature extraction network 1110 and a feature map to which transform into a low dimension, encoding, decoding, and inverse transform have been applied.

FIG. 16 is a flowchart showing feature encoding methods according to Embodiment 2-2, and FIG. 17 is a flowchart showing a feature decoding method according to Embodiment 2-2.

Referring to FIG. 16, the feature encoding apparatus 10 may extract a feature map from an image and transform the extracted feature map into a low dimension (S1610). That is, the feature encoding apparatus 10 may derive the transformed feature map based on the extracted feature map.

The feature encoding apparatus 10 may encode the transformed feature map and decode the encoded feature map again (S1620). In addition, the feature encoding apparatus 10 may inversely transform the decoded feature map into a high dimension (the same dimension as the extracted feature map) (S1630) and derive filtering information based on the extracted feature map and the inversely transformed feature map (S1640). Here, the inversely transformed feature map corresponds to a feature map that has undergone all feature transform, encoding, decoding, and inverse transform processes.

The transformed feature map and filtering information may be encoded and signaled to the feature decoding apparatus 20.

Referring to FIG. 17, the feature decoding apparatus 20 may obtain a feature map (transformed into a low dimension) and filtering information from a bitstream (S1710). In addition, the feature decoding apparatus 20 may inversely transform the feature map into a high dimension (S1720), and filter the feature map inversely transformed into the high dimension based on filtering information (S1730), thereby compensating for errors due to dimensional transform.

According to Embodiment 2-2, filtering information may be derived by reflecting errors that occur during the encoding process and decoding process of the feature map, and thus the accuracy of error compensation can be improved.

Embodiment 2-3

Since the feature map extracted through the feature extraction network 1110 has data in the float range for each pixel, it may be a significant burden in terms of complexity of implementation and operation. To solve this, a quantization process needs to be performed so that the feature map exists within a specific bit-depth range.

Embodiment 2-3 is a method of generating filtering information based on a feature map to which quantization is applied and a feature map to which quantization, transform, and inverse transform are applied. FIG. 18 is a flowchart showing a feature encoding method according to Embodiment 2-3, and FIG. 19 is a flowchart showing a feature decoding method according to Embodiment 2-3.

Referring to FIG. 18, the feature encoding apparatus 10 may extract a feature map from an image and quantize the extracted feature map (S1810). Additionally, the feature encoding apparatus 10 may transform the quantized feature map into a low dimension (S1820) and inversely transform the transformed feature map (S1830).

The feature encoding apparatus 10 may derive filtering information based on the quantized feature map and the inversely transformed feature map (S1840). Here, the inversely transformed feature map may be a feature map that has gone through quantization, transform, and inverse transform processes.

Figures 19, 20:
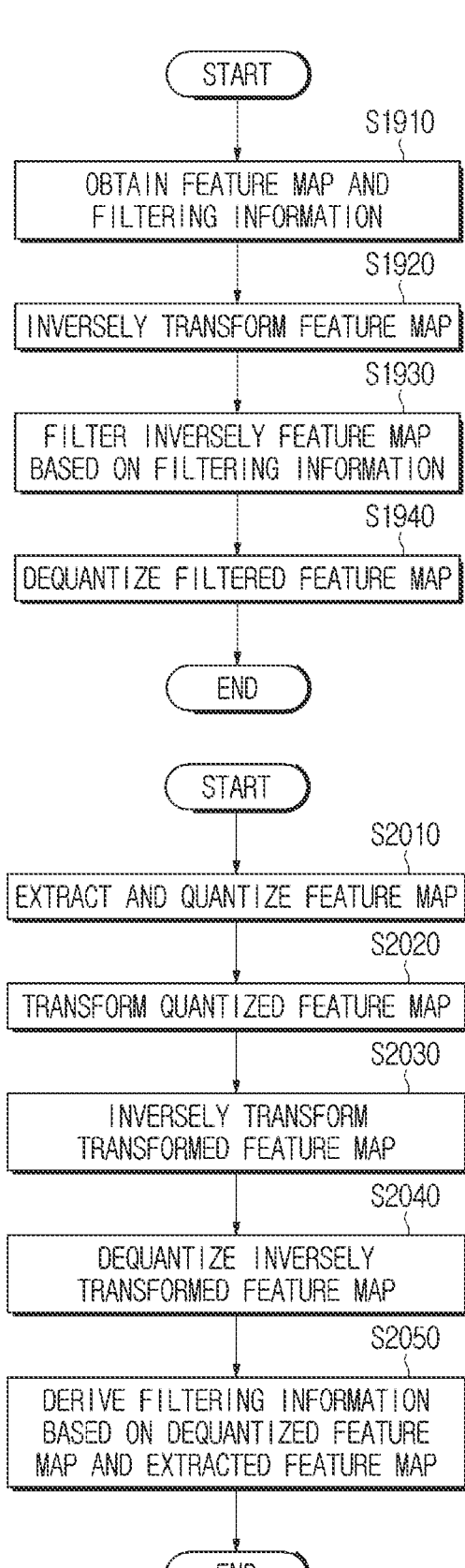
FIG. 19 is a flowchart illustrating a feature decoding method according to an embodiment of the present disclosure.
FIG. 20 is a flowchart illustrating a feature encoding method according to an embodiment of the present disclosure.

Referring to FIG. 19, the feature decoding apparatus 20 may obtain a feature map (transformed into a low dimension) and filtering information from a bitstream (S1910). Here, the feature map may be a first feature map or first feature information.

The feature decoding apparatus 20 may inversely transform the feature map into a high dimension (S1920) and filter the feature map inversely transformed into the high dimension based on filtering information (S1930), thereby compensating for errors. The feature decoding apparatus 20 may dequantize the filtered feature map (S1940). The dequantized feature map may be a second feature map or second feature information.

When combining processes of S1930 and S1940, processes of S1930 and S1940 may be a process of deriving the second feature information of the 'inversely transformed first feature information' based on filtering information.

Embodiment 2-4

Embodiment 2-4 is a method of generating filtering information based on an extracted feature map and a feature map to which quantization, transform, inverse transform, and dequantization are applied. FIG. 20 is a flowchart illustrating a feature encoding method according to Embodiment 2-4, and FIG. 21 is a flowchart illustrating a feature decoding method according to Embodiment 2-4.

Referring to FIG. 20, the feature encoding apparatus 10 may extract a feature map from an image and quantize the extracted feature map (S2010). Additionally, the feature encoding apparatus 10 may transform the quantized feature map into a low dimension (S2020) and inversely transform the transformed feature map (S2030).

Furthermore, the feature encoding apparatus 10 may dequantize the inversely transformed feature map (S2040). The feature encoding apparatus 10 may derive filtering information based on the dequantized feature map and the extracted feature map (S2050). Here, the dequantized feature map may be a feature map that has undergone quantization, transform, inverse transform, and dequantization processes.

Figure 21:
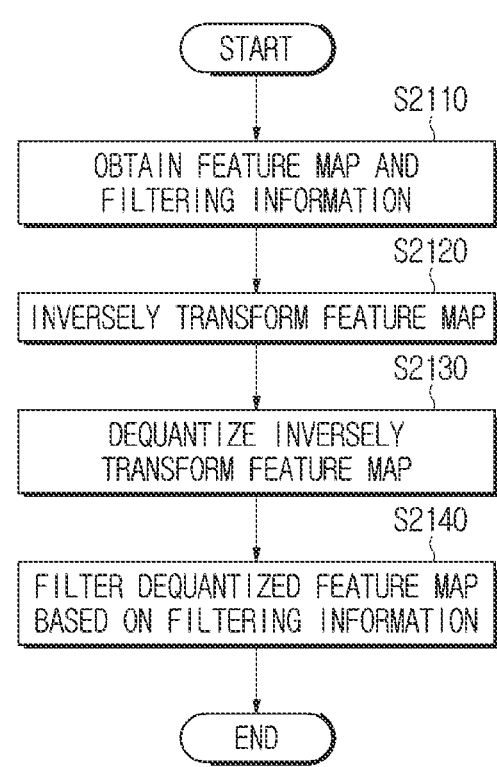
FIG. 21 is a flowchart illustrating a feature decoding method according to an embodiment of the present disclosure.

Referring to FIG. 21, the feature decoding apparatus 20 may obtain a feature map (transformed into a low dimension) and filtering information from a bitstream (S2110). Here, the feature map may be a first feature map or first feature information.

The feature decoding apparatus 20 may inversely transform the feature map into a high dimension (S2120) and dequantize the feature map inversely transformed into the high dimension (S2130). Additionally, the feature decoding apparatus 20 may compensate for errors by filtering the dequantized feature map based on filtering information (S2140). Here, the filtered feature map may be a second feature map or second feature information. The process of S2140 may be a process of deriving second feature information of the 'inversely transformed first feature information' based on the filtering information.

Comparing Embodiment 2-3 and Embodiment 2-4, the filtering information is derived through relatively few processes in Embodiment 2-3, while filtering information is derived through additional processes in Embodiment 2-4. Therefore, according to Embodiment 2-3, complexity can be reduced, and according to Embodiment 2-4, filtering information can be derived more accurately.

Meanwhile, in Embodiments 2-3 and 2-4, filtering information (whether filtering is applied, filter parameter, etc.) required for the filtering process shall be forwarded to an element performing filtering. The filtering information may be forwarded to an element performing filtering through an element performing inverse transform and an element performing dequantization, or may be directly forwarded to an element performing filtering.

Embodiment 3

Embodiment 3 is an embodiment of a method of signaling filtering information.

As described above, the filtering information may include information specifying whether filtering is applied and information specifying a filtering parameter.

The feature encoding apparatus 10 may encode and signal information specifying whether filtering is applied and information specifying a filtering parameter in feature units (or feature level), and the feature decoding apparatus 20 may obtain information specifying whether filtering is applied and information specifying a filtering parameter in feature units. Here, the feature unit may be an individual feature channel or a set of feature channels. When similar feature channels are grouped and encoded, filtering information may be shared, thereby improving compression efficiency.

An example of signaling filtering information in feature units is shown in Table 1.

TABLE 1

```
feature_coding( ) {
    ...
    if (feature_ALF_flag ){
        ALF_Param
    }
    ...
}
```

In Table 1, feature_ALF_flag is information specifying whether filtering is applied. A first value (e.g., 1) of feature_ALF_flag may specify that filtering is applied, and a second value (e.g., 0) of feature_ALF_flag may specify that filtering is not applied. ALF_Param may be information representing a filtering parameter.

Depending on embodiments, the feature encoding apparatus 10 may encode and signal information specifying whether filtering is applied and information specifying the filtering parameter at a higher level than the feature. Here, the higher level may be a level including a plurality of features. The feature decoding apparatus 20 may obtain information specifying whether filtering is applied and information specifying a filtering parameter from the higher level.

The higher level may be a level corresponding to a relatively large scale unit, such as Sequence Parameter Set (SPS), Picture Parameter Set (PPS), Picture Header (PH), and Slice Header (SH).

An example of filtering information being signaled at a higher level is shown in Table 2.

TABLE 2

```
feature_header_set ( ) {
    ...
    feature_ALF_flag
    if (feature_ALF_flag ){
        ALF_Param
    }
    ...
}
```

In Table 2, feature_ALF_flag is information specifying whether filtering is applied. A first value (e.g., 1) of feature_ALF_flag may specify that filtering is applied, and a second value (e.g., 0) of feature_ALF_flag may specify that filtering is not applied. ALF_Param may be information representing a filtering parameter.

In Tables 1 and 2, feature_ALF_flag may be a first syntax element, and ALF_Param may be a second syntax element. ALF_Param may be signaled when feature_ALF_flag has a value specifying that filtering is applied.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Embodiments described in the present disclosure may be implemented and performed on a processor, microprocessor, controller, or chip. For example, the functional units shown in each drawing may be implemented and performed on a computer, processor, microprocessor, controller, or chip. In this case, information for implementation (e.g., information on instructions) or algorithm may be stored in a digital storage medium.

In addition, the decoder (decoding apparatus) and the encoder (encoding apparatus), to which the embodiment(s) of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, an argument reality (AR) device, a video telephony video device, a transportation terminal (e.g., vehicle (including autonomous vehicle) terminal, robot terminal, airplane terminal, ship terminal, etc.) and a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Additionally, a processing method to which the embodiment(s) of the present disclosure is applied may be produced in the form of a program executed by a computer and stored in a computer-readable recording medium. Multimedia data having a data structure according to the embodiment(s) of this document may also be stored in a computer-readable recording medium. Computer-readable recording media include all types of storage devices and distributed storage devices that store computer-readable data. Computer-readable recording media include, for example, Blu-ray Disc (BD), Universal Serial Bus (USB), ROM, PROM, EPROM, EEPROM, RAM, CD-ROM, magnetic tape, floppy disk, and optical data storage device. Additionally, computer-readable recording media include media implemented in the form of carrier waves (e.g., transmission via the Internet). Additionally, the bitstream generated by the encoding method may be stored in a computer-readable recording medium or transmitted through a wired or wireless communication network.

Additionally, the embodiment(s) of the present disclosure may be implemented as a computer program product by program code, and the program code may be executed on a computer by the embodiment(s) of the present disclosure. The program code may be stored on a carrier readable by a computer.

Figure 22:
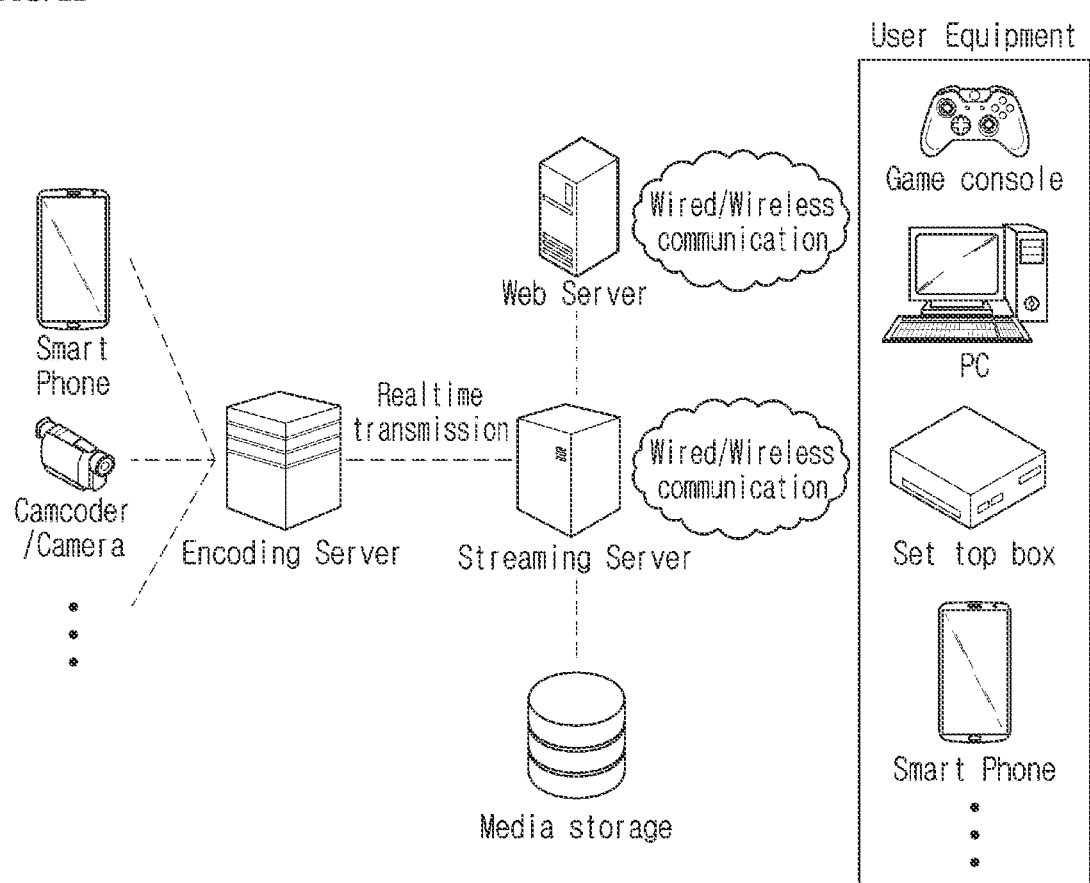
FIG. 22 is a view illustrating an example of a content streaming system to which embodiments of the present disclosure are applicable.

FIG. 22 is a view illustrating an example of a content streaming system to which embodiments of the present disclosure are applicable.

Referring to FIG. 22, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

Figure 23:
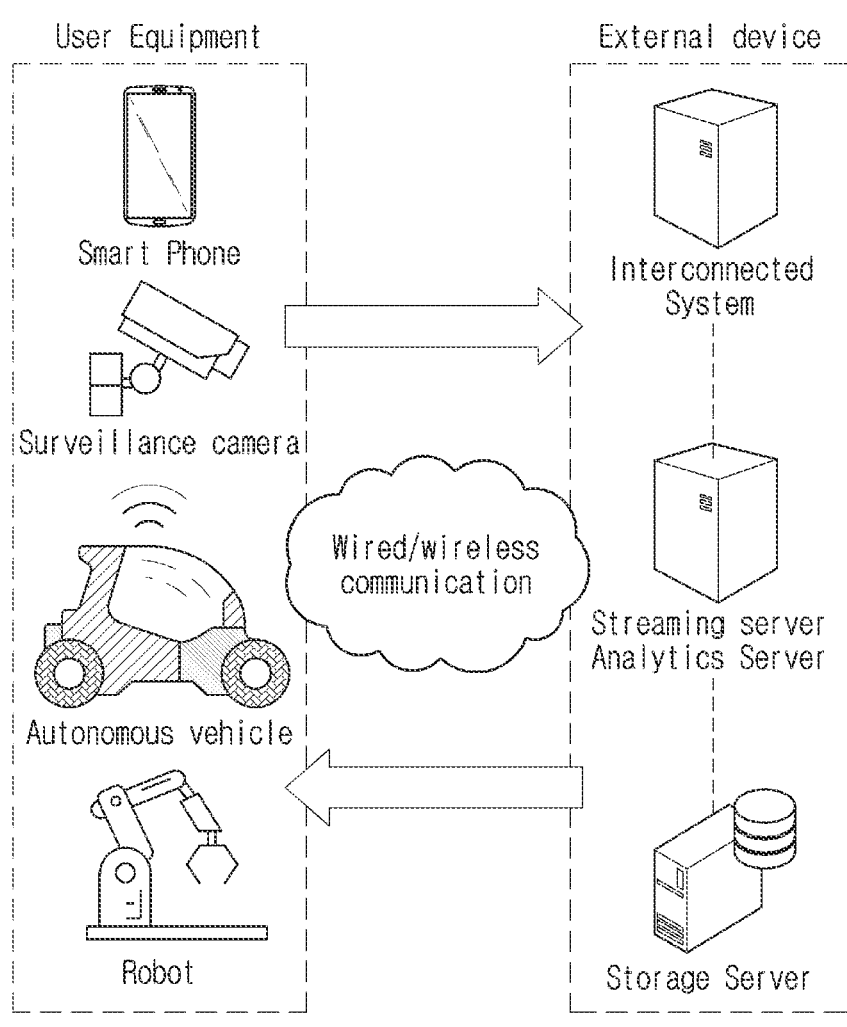
FIG. 23 is a view showing another example of a content streaming system to which embodiments of the present disclosure are applicable.

FIG. 23 is a diagram illustrating another example of a content streaming system to which embodiments of the present disclosure are applicable.

Referring to FIG. 23, in an embodiment such as VCM, a task may be performed in a user terminal or a task may be performed in an external device (e.g., streaming server, analysis server, etc.) according to the performance of the device, the user's request, the characteristics of the task to be performed, etc. In this way, in order to transmit information necessary to perform a task to an external device, the user terminal may generate a bitstream including information necessary to perform the task (e.g., information such as task, neural network and/or usage) directly or through an encoding server.

In an embodiment, the analysis server may perform a task requested by the user terminal after decoding the encoded information received from the user terminal (or from the encoding server). At this time, the analysis server may transmit the result obtained through the task performance back to the user terminal or may transmit it to another linked service server (e.g., web server). For example, the analysis server may transmit a result obtained by performing a task of determining a fire to a fire-related server. In this case, the analysis server may include a separate control server. In this case, the control server may serve to control a command/response between each device associated with the analysis server and the server. In addition, the analysis server may request desired information from a web server based on a task to be performed by the user device and the task information that may be performed. When the analysis server requests a desired service from the web server, the web server transmits it to the analysis server, and the analysis server may transmit data to the user terminal. In this case, the control server of the content streaming system may serve to control a command/response between devices in the streaming system. The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

The embodiments of the present disclosure may be used to encode or decode a feature/feature map.

What is claimed is:

1. A feature decoding method performed by a feature decoding apparatus, the feature decoding method comprising:

obtaining first feature information and filtering information for the first feature information from a bitstream;

inversely transforming the first feature information; and deriving second feature information for the inversely transformed first feature information based on the filtering information, wherein the second feature information is derived by filtering the inversely transformed first feature information based on the filtering information and dequantizing the filtered first feature information, wherein the filtering information includes quantized information including a first syntax element specifying whether filtering is applied and a second syntax element specifying a parameter of the filtering.

2. The feature decoding method of claim 1, wherein the second feature information is derived by filtering the inversely transformed first feature information based on the filtering information.

3. The feature decoding method of claim 1, wherein the second feature information is derived by dequantizing the inversely transformed first feature information and filtering the dequantized first feature information based on the filtering information.

4. The feature decoding method of claim 1, wherein the second syntax element is obtained based on the first syntax element specifying that the filtering is applied.

5. The feature decoding method of claim 1, wherein the filtering information is obtained from a feature level of the bitstream or obtained from a level higher than a feature level of the bitstream.

6. A feature encoding method performed by a feature encoding apparatus, the feature encoding method comprising:

deriving transformed feature information based on feature information extracted from an image;

deriving inversely transformed feature information based on the transformed feature information; and deriving filtering information based on the inversely transformed feature information, wherein the deriving the transformed feature information comprises:

quantizing the extracted feature information; and deriving the transformed feature information by transforming the quantized feature information, wherein the filtering information includes quantized information including a first syntax element specifying whether filtering is applied and a second syntax element specifying a parameter of the filtering.

7. The feature encoding method of claim 6, wherein the filtering information is derived based on the inversely transformed feature information and the extracted feature information.

8. The feature encoding method of claim 6, wherein the deriving the inversely transformed feature information comprises:

encoding the transformed feature information and decoding the encoded feature information; and deriving the inversely transformed feature information by inversely transforming the decoded feature information.

9. The feature encoding method of claim 6, wherein the deriving the filtering information comprises:

dequantizing the inversely transformed feature information; and deriving the filtering information based on the dequantized feature information.

10. The feature encoding method of claim 6, wherein the filtering information is derived based on the quantized feature information and the inversely transformed feature information.

11. The feature encoding method of claim 6, wherein the second syntax element is included in the filtering information based on the filtering being applied.

12. The feature encoding method of claim 6, wherein the filtering information is encoded into a feature level of the bitstream or encoded into a level higher than a feature level of the bitstream.

13. A method of transmitting a bitstream generated by a feature encoding method, the feature encoding method comprising:

deriving transformed feature information based on feature information extracted from an image;

deriving inversely transformed feature information based on the transformed feature information; and deriving filtering information based on the inversely transformed feature information, wherein the deriving the transformed feature information comprises:

quantizing the extracted feature information; and deriving the transformed feature information by transforming the quantized feature information, wherein the filtering information includes quantized information including a first syntax element specifying whether filtering is applied and a second syntax element specifying a parameter of the filtering.

* * * * *